United States Patent
Hao et al.

(10) Patent No.: US 12,255,841 B2
(45) Date of Patent: Mar. 18, 2025

(54) UPLINK SUBBAND PRECODING VIA LINEAR COMBINATION OF FREQUENCY DOMAIN BASES

(71) Applicant: QUALCOMM Incorporated, San Diego, CA (US)

(72) Inventors: Chenxi Hao, Beijing (CN); Yu Zhang, San Diego, CA (US); Liangming Wu, Beijing (CN); Qiaoyu Li, Beijing (CN); Chao Wei, Beijing (CN); Hao Xu, Beijing (CN); Peter Gaal, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 340 days.

(21) Appl. No.: 17/767,378

(22) PCT Filed: Nov. 1, 2019

(86) PCT No.: PCT/CN2019/115010
§ 371 (c)(1),
(2) Date: Apr. 7, 2022

(87) PCT Pub. No.: WO2021/081981
PCT Pub. Date: May 6, 2021

(65) Prior Publication Data
US 2023/0155763 A1 May 18, 2023

(51) Int. Cl.
*H04L 5/00* (2006.01)
(52) U.S. Cl.
CPC .......... *H04L 5/0048* (2013.01); *H04L 5/0053* (2013.01)
(58) Field of Classification Search
CPC ..... H04L 5/0048; H04L 5/0053; H04L 5/001; H04L 5/005; H04L 5/0055; H04L 5/0023;
(Continued)

(56) References Cited

U.S. PATENT DOCUMENTS

2021/0143874 A1  5/2021 Park et al.
2022/0158801 A1*  5/2022 Huang ................ H04L 25/0224
(Continued)

FOREIGN PATENT DOCUMENTS

CN   108271265 A   7/2018
CN   109565311 A   4/2019
(Continued)

OTHER PUBLICATIONS

Huawei, et al., "Discussion on Reciprocity Based CSI Acquisition Mechanism," 3GPP Draft, 3GPP TSG RAN WG1 Meeting #89, R1-1708137, 3rd Generation Partnership Project (3GPP), Mobile Competence Centre, 650, Route Des Lucioles, F-06921, Sophia-Antipolis Cedex, France, vol. RAN WG1, No. Hangzhou, China; May 15, 2017-May 19, 2017, May 19, 2017, XP051273333, 10 Pages, Retrieved from the Internet: URL: http://www.3gpp.org/ftp/Meetings_3GPP_SYNC/RAN1/Docs/ [retrieved on May 14, 2017] Section 2.

(Continued)

*Primary Examiner* — Hashim S Bhatti
(74) *Attorney, Agent, or Firm* — QUALCOMM Incorporated

(57) ABSTRACT

Certain aspects of the present disclosure provide techniques for using subband precoding for uplink transmissions. In some cases, a UE may transmit sounding reference signals (SRS) to a network entity, receive information indicating at least one of a set of one or more frequency domain (FD) bases and linear combination coefficients, determined based on the SRS transmission, determine subband precoding based at least in part on linear combinations of the FD bases based on the linear combination coefficients, and transmit a physical uplink shared channel (PUSCH) with the subband precoding.

32 Claims, 20 Drawing Sheets

(58) Field of Classification Search
CPC ... H04L 5/0044; H04L 5/0057; H04B 7/0404; H04B 7/0456; H04B 7/048; H04B 7/0626
See application file for complete search history.

(56) References Cited

U.S. PATENT DOCUMENTS

| | | | | |
|---|---|---|---|---|
| 2022/0239357 A1* | 7/2022 | Chung | ............ | H04B 17/345 |
| 2022/0239360 A1* | 7/2022 | Faxér | ............ | H04B 7/0478 |

FOREIGN PATENT DOCUMENTS

| | | |
|---|---|---|
| WO | 2016068628 A1 | 5/2016 |
| WO | 2018231008 A1 | 12/2018 |

OTHER PUBLICATIONS

International Search Report and Written Opinion—PCT/CN2019/115010—ISA/EPO—Aug. 11, 2020.
SAMSUNG: "Outcome of Offline Session for CSI Enhancement for MU-MIMO Support", 3GPP TSG RAN WG1 Meeting #95, R1-1814201, Nov. 12, 2018-Nov. 16, 2018, Nov. 16, 2018 (Nov. 16, 2018), 3 Pages, the whole document, part 2.2.
SAMSUNG: "Summary of CSI Enhancement for MU-MIMO Support", 3GPP TSG RAN WG1 Meeting #95, R1-1813002, Nov. 12, 2018-Nov. 16, 2018, Nov. 16, 2018 (Nov. 16, 2018), 9 Pages, Section 2.1, the Whole Document.
CATT: "Discussions on Type II CSI enhancement", 3GPP TSG RAN WG1 Ad-Hoc Meeting 1901, R1-1901295, 3rd Generation Partnership Project (3GPP), Mobile Competence Centre, 650, Route Des Lucioles, F-06921, Sophia-antipolis Cedex, France, vol. RAN WG1, No. Taipei, Jan. 21, 2019-Jan. 25, 2019, 14 Pages, Jan. 18, 2019, XP051601240, pp. 1,4,10.
Supplementary European Search Report—EP19950730—Search Authority—Munich—Jun. 5, 2023.

* cited by examiner

610 ⟶

| | Layer 0 | Layer 1 | Layer 2 | Layer 3 |
|---|---|---|---|---|
| RI = 4 | M2 < M | M2 < M | M2 < M | M2 < M |
| RI = 3 | M2 < M | M2 < M | M2 < M | |
| RI = 2 | M | M | | |
| RI = 1 | M | | | |

FIG. 6

PUSCH ports via the SRS
ports within the selected
resource $$\begin{bmatrix} z^{(p_0)}(i) \\ \vdots \\ z^{(p_{\rho-1})}(i) \end{bmatrix} = W \begin{bmatrix} y^{(0)}(i) \\ \vdots \\ y^{(\upsilon-1)}(i) \end{bmatrix}$$

PUSCH layers

WB precoder → maps layers to PUSCH ports
Drawn from finite set

FIG. 9

PUSCH ports via the SRS ports across the selected resource(s)

PUSCH layers

SRS port in 1st selected SRS res

SRS port in $p$-th selected SRS res $$\begin{bmatrix} \bar{z}^{(p_0)}(i) \\ \vdots \\ \bar{z}^{(p_{\rho-1})}(i) \end{bmatrix} = W \begin{bmatrix} y^{(0)}(i) \\ \vdots \\ y^{(\upsilon-1)}(i) \end{bmatrix}$$

Identity matrix (no need of configuration)

FIG. 11

Precoding matrix $W$ for single-layer transmission using two antenna ports.

| TPMI index | $W$ (ordered from left to right in increasing order of TPMI index) | | | | | |
|---|---|---|---|---|---|---|
| 0 – 5 | $\frac{1}{\sqrt{2}}\begin{bmatrix}1\\0\end{bmatrix}$ | $\frac{1}{\sqrt{2}}\begin{bmatrix}0\\1\end{bmatrix}$ | $\frac{1}{\sqrt{2}}\begin{bmatrix}1\\1\end{bmatrix}$ | $\frac{1}{\sqrt{2}}\begin{bmatrix}1\\-1\end{bmatrix}$ | $\frac{1}{\sqrt{2}}\begin{bmatrix}1\\j\end{bmatrix}$ | $\frac{1}{\sqrt{2}}\begin{bmatrix}1\\-j\end{bmatrix}$ |

FIG. 12A

Precoding matrix $W$ for two-layer transmission using two antenna ports with transform precoding disabled.

| TPMI index | $W$ (ordered from left to right in increasing order of TPMI index) | | |
|---|---|---|---|
| 0 – 2 | $\frac{1}{\sqrt{2}}\begin{bmatrix}1 & 0\\0 & 1\end{bmatrix}$ | $\frac{1}{2}\begin{bmatrix}1 & 1\\1 & -1\end{bmatrix}$ | $\frac{1}{2}\begin{bmatrix}1 & 1\\j & -j\end{bmatrix}$ |

FIG. 12B

Precoding matrix $W$ for three-layer transmission using four antenna ports with transform precoding disabled.

| TPMI index | $W$ (ordered from left to right in increasing order of TPMI index) | | | |
|---|---|---|---|---|
| 0 – 3 | $\frac{1}{2}\begin{bmatrix}1&0&0\\0&1&0\\0&0&1\\0&0&0\end{bmatrix}$ | $\frac{1}{2}\begin{bmatrix}1&0&0\\0&1&0\\1&0&0\\0&0&1\end{bmatrix}$ | $\frac{1}{2}\begin{bmatrix}1&0&0\\0&1&0\\-1&0&0\\0&0&1\end{bmatrix}$ | $\frac{1}{2\sqrt{3}}\begin{bmatrix}1&1&1\\1&-1&1\\1&1&-1\\1&-1&-1\end{bmatrix}$ |
| 4 – 6 | $\frac{1}{2\sqrt{3}}\begin{bmatrix}1&1&1\\1&-1&1\\j&j&-j\\j&-j&-j\end{bmatrix}$ | $\frac{1}{2\sqrt{3}}\begin{bmatrix}1&1&1\\-1&1&-1\\1&1&-1\\-1&1&1\end{bmatrix}$ | $\frac{1}{2\sqrt{3}}\begin{bmatrix}1&1&1\\-1&1&-1\\j&j&-j\\-j&j&j\end{bmatrix}$ | |

FIG. 12C

Precoding matrix $W$ for single-layer transmission using four antenna ports with transform precoding disabled.

| TPMI index | $W$ (ordered from left to right in increasing order of TPMI index) | | | | | | | |
|---|---|---|---|---|---|---|---|---|
| 0 – 7 | $\frac{1}{2}\begin{bmatrix}1\\0\\0\\0\end{bmatrix}$ | $\frac{1}{2}\begin{bmatrix}0\\1\\0\\0\end{bmatrix}$ | $\frac{1}{2}\begin{bmatrix}0\\0\\1\\0\end{bmatrix}$ | $\frac{1}{2}\begin{bmatrix}0\\0\\0\\1\end{bmatrix}$ | $\frac{1}{2}\begin{bmatrix}1\\0\\1\\0\end{bmatrix}$ | $\frac{1}{2}\begin{bmatrix}1\\0\\-1\\0\end{bmatrix}$ | $\frac{1}{2}\begin{bmatrix}1\\0\\j\\0\end{bmatrix}$ | $\frac{1}{2}\begin{bmatrix}1\\0\\-j\\0\end{bmatrix}$ |
| 8 – 15 | $\frac{1}{2}\begin{bmatrix}0\\1\\0\\1\end{bmatrix}$ | $\frac{1}{2}\begin{bmatrix}0\\1\\0\\-1\end{bmatrix}$ | $\frac{1}{2}\begin{bmatrix}0\\1\\0\\j\end{bmatrix}$ | $\frac{1}{2}\begin{bmatrix}0\\1\\0\\-j\end{bmatrix}$ | $\frac{1}{2}\begin{bmatrix}1\\1\\1\\1\end{bmatrix}$ | $\frac{1}{2}\begin{bmatrix}1\\1\\j\\j\end{bmatrix}$ | $\frac{1}{2}\begin{bmatrix}1\\1\\-1\\-1\end{bmatrix}$ | $\frac{1}{2}\begin{bmatrix}1\\1\\-j\\-j\end{bmatrix}$ |
| 16 – 23 | $\frac{1}{2}\begin{bmatrix}1\\j\\1\\j\end{bmatrix}$ | $\frac{1}{2}\begin{bmatrix}1\\j\\j\\-1\end{bmatrix}$ | $\frac{1}{2}\begin{bmatrix}1\\j\\-1\\-j\end{bmatrix}$ | $\frac{1}{2}\begin{bmatrix}1\\j\\-j\\1\end{bmatrix}$ | $\frac{1}{2}\begin{bmatrix}1\\-1\\1\\-1\end{bmatrix}$ | $\frac{1}{2}\begin{bmatrix}1\\-1\\j\\-j\end{bmatrix}$ | $\frac{1}{2}\begin{bmatrix}1\\-1\\-1\\1\end{bmatrix}$ | $\frac{1}{2}\begin{bmatrix}1\\-1\\-j\\j\end{bmatrix}$ |
| 24 – 27 | $\frac{1}{2}\begin{bmatrix}1\\-j\\1\\-j\end{bmatrix}$ | $\frac{1}{2}\begin{bmatrix}1\\-j\\j\\1\end{bmatrix}$ | $\frac{1}{2}\begin{bmatrix}1\\-j\\-1\\j\end{bmatrix}$ | $\frac{1}{2}\begin{bmatrix}1\\-j\\-j\\-1\end{bmatrix}$ | | | | |

FIG. 12D

Precoding matrix $W$ for two-layer transmission using four antenna ports with transform precoding disabled.

| TPMI index | $W$ (ordered from left to right in increasing order of TPMI index) | | | |
|---|---|---|---|---|
| 0 – 3 | $\frac{1}{2}\begin{bmatrix}1&0\\0&1\\0&0\\0&0\end{bmatrix}$ | $\frac{1}{2}\begin{bmatrix}1&0\\0&0\\0&1\\0&0\end{bmatrix}$ | $\frac{1}{2}\begin{bmatrix}1&0\\0&0\\0&0\\0&1\end{bmatrix}$ | $\frac{1}{2}\begin{bmatrix}0&0\\1&0\\0&1\\0&0\end{bmatrix}$ |
| 4 – 7 | $\frac{1}{2}\begin{bmatrix}0&0\\1&0\\0&0\\0&1\end{bmatrix}$ | $\frac{1}{2}\begin{bmatrix}0&0\\0&0\\1&0\\0&1\end{bmatrix}$ | $\frac{1}{2}\begin{bmatrix}1&0\\0&1\\1&0\\0&-j\end{bmatrix}$ | $\frac{1}{2}\begin{bmatrix}1&0\\0&1\\1&0\\0&j\end{bmatrix}$ |
| 8 – 11 | $\frac{1}{2}\begin{bmatrix}1&0\\0&1\\-j&0\\0&1\end{bmatrix}$ | $\frac{1}{2}\begin{bmatrix}1&0\\0&1\\-j&0\\0&-1\end{bmatrix}$ | $\frac{1}{2}\begin{bmatrix}1&0\\0&1\\-1&0\\0&-j\end{bmatrix}$ | $\frac{1}{2}\begin{bmatrix}1&0\\0&1\\-1&0\\0&j\end{bmatrix}$ |
| 12 – 15 | $\frac{1}{2}\begin{bmatrix}1&0\\0&1\\j&0\\0&1\end{bmatrix}$ | $\frac{1}{2}\begin{bmatrix}1&0\\0&1\\j&0\\0&-1\end{bmatrix}$ | $\frac{1}{2\sqrt{2}}\begin{bmatrix}1&1\\1&1\\1&-1\\1&-1\end{bmatrix}$ | $\frac{1}{2\sqrt{2}}\begin{bmatrix}1&1\\1&1\\j&-j\\j&-j\end{bmatrix}$ |
| 16 – 19 | $\frac{1}{2\sqrt{2}}\begin{bmatrix}1&1\\j&j\\1&-1\\j&-j\end{bmatrix}$ | $\frac{1}{2\sqrt{2}}\begin{bmatrix}1&1\\j&j\\j&-j\\-1&1\end{bmatrix}$ | $\frac{1}{2\sqrt{2}}\begin{bmatrix}1&1\\-1&-1\\1&-1\\-1&1\end{bmatrix}$ | $\frac{1}{2\sqrt{2}}\begin{bmatrix}1&1\\-1&-1\\j&-j\\-j&j\end{bmatrix}$ |
| 20 – 21 | $\frac{1}{2\sqrt{2}}\begin{bmatrix}1&1\\-j&-j\\1&-1\\-j&j\end{bmatrix}$ | $\frac{1}{2\sqrt{2}}\begin{bmatrix}1&1\\-j&-j\\j&-j\\1&-1\end{bmatrix}$ | - | - |

FIG. 12E

Precoding matrix $W$ for four-layer transmission using four antenna ports with transform precoding disabled.

| TPMI index | $W$ (ordered from left to right in increasing order of TPMI index) | | | |
|---|---|---|---|---|
| 0 – 3 | $\frac{1}{2}\begin{bmatrix}1&0&0&0\\0&1&0&0\\0&0&1&0\\0&0&0&1\end{bmatrix}$ | $\frac{1}{2\sqrt{2}}\begin{bmatrix}1&1&0&0\\0&0&1&1\\1&-1&0&0\\0&0&1&-1\end{bmatrix}$ | $\frac{1}{2\sqrt{2}}\begin{bmatrix}1&1&0&0\\0&0&1&1\\j&-j&0&0\\0&0&j&-j\end{bmatrix}$ | $\frac{1}{4}\begin{bmatrix}1&1&1&1\\1&-1&1&-1\\1&1&-1&-1\\1&-1&-1&1\end{bmatrix}$ |
| 4 | $\frac{1}{4}\begin{bmatrix}1&1&1&1\\1&-1&1&-1\\j&j&-j&-j\\j&-j&-j&j\end{bmatrix}$ | - | - | - |

FIG. 12F

| | FD unit 0 | FD unit 1 | ... | FD unit $N_3-1$ |
|---|---|---|---|---|
| Port 0 | $\sum_{m=0}^{M_{0,l}-1} c_{0,m,l} \cdot f_{k_{0,m,l}}^H[0]$ | $\sum_{m=0}^{M_{0,l}-1} c_{0,m,l} \cdot f_{k_{0,m,l}}^H[1]$ | ... | $\sum_{m=0}^{M_{0,l}-1} c_{0,m,l} \cdot f_{k_{0,m,l}}^H[N_3-1]$ |
| Port 1 | $\sum_{m=0}^{M_{1,l}-1} c_{0,m,l} \cdot f_{k_{1,m,l}}^H[0]$ | $\sum_{m=0}^{M_{1,l}-1} c_{0,m,l} \cdot f_{k_{1,m,l}}^H[1]$ | ... | $\sum_{m=0}^{M_{1,l}-1} c_{0,m,l} \cdot f_{k_{1,m,l}}^H[N_3-1]$ |
| Port 2 | $\sum_{m=0}^{M_{2,l}-1} c_{0,m,l} \cdot f_{k_{2,m,l}}^H[0]$ | $\sum_{m=0}^{M_{2,l}-1} c_{0,m,l} \cdot f_{k_{2,m,l}}^H[1]$ | ... | $\sum_{m=0}^{M_{2,l}-1} c_{0,m,l} \cdot f_{k_{2,m,l}}^H[N_3-1]$ |
| Port 3 | $\sum_{m=0}^{M_{3,l}-1} c_{3,m,l} \cdot f_{k_{3,m,l}}^H[0]$ | $\sum_{m=0}^{M_{3,l}-1} c_{3,m,l} \cdot f_{k_{3,m,l}}^H[1]$ | ... | $\sum_{m=0}^{M_{3,l}-1} c_{3,m,l} \cdot f_{k_{3,m,l}}^H[N_3-1]$ |

FIG. 16

Layer-common + port-common

$$\frac{1}{\sqrt{\nu}} \times \begin{bmatrix} \sum_{m=0}^{M-1} c_{0,m,0} \cdot f_{k_m}^H \\ \vdots \\ \sum_{m=0}^{M-1} c_{p-1,m,0} \cdot f_{k_m}^H \end{bmatrix} \quad \frac{1}{\sqrt{\nu}} \times \begin{bmatrix} \sum_{m=0}^{M-1} c_{0,m,1} \cdot f_{k_m}^H \\ \vdots \\ \sum_{m=0}^{M-1} c_{p-1,m,1} \cdot f_{k_m}^H \end{bmatrix}$$

FIG. 17A

Layer-specific + port-common

$$\frac{1}{\sqrt{\nu}} \times \begin{bmatrix} \sum_{m=0}^{M_0-1} c_{0,m,0} \cdot f_{k_{m,0}}^H \\ \vdots \\ \sum_{m=0}^{M_0-1} c_{p-1,m,0} \cdot f_{k_{m,0}}^H \end{bmatrix} \quad \frac{1}{\sqrt{\nu}} \times \begin{bmatrix} \sum_{m=0}^{M_1-1} c_{0,m,1} \cdot f_{k_{m,1}}^H \\ \vdots \\ \sum_{m=0}^{M_1-1} c_{p-1,m,1} \cdot f_{k_{m,1}}^H \end{bmatrix}$$

FIG. 17B

Layer-common + port-specific

$$\frac{1}{\sqrt{\nu}} \times \begin{bmatrix} \sum_{m=0}^{M_0-1} c_{0,m,0} \cdot f_{k_{0,m}}^H \\ \vdots \\ \sum_{m=0}^{M_{p-1}-1} c_{p-1,m,0} \cdot f_{k_{p-1,m}}^H \end{bmatrix} \quad \frac{1}{\sqrt{\nu}} \times \begin{bmatrix} \sum_{m=0}^{M_0-1} c_{0,m,1} \cdot f_{k_{0,m}}^H \\ \vdots \\ \sum_{m=0}^{M_{p-1}-1} c_{p-1,m,1} \cdot f_{k_{p-1,m}}^H \end{bmatrix}$$

FIG. 17C

Layer-specific + port-specific

$$\frac{1}{\sqrt{\nu}} \times \begin{bmatrix} \sum_{m=0}^{M_{0,0}-1} c_{0,m,0} \cdot f_{k_{0,m,0}}^H \\ \vdots \\ \sum_{m=0}^{M_{p-1,0}-1} c_{p-1,m,0} \cdot f_{k_{p-1,m,0}}^H \end{bmatrix} \quad \frac{1}{\sqrt{\nu}} \times \begin{bmatrix} \sum_{m=0}^{M_{0,1}-1} c_{0,m,1} \cdot f_{k_{0,m,1}}^H \\ \vdots \\ \sum_{m=0}^{M_{p-1,1}-1} c_{p-1,m,1} \cdot f_{k_{p-1,m,1}}^H \end{bmatrix}$$

FIG. 17D

UPLINK SUBBAND PRECODING VIA LINEAR COMBINATION OF FREQUENCY DOMAIN BASES

CROSS-REFERENCE TO RELATED APPLICATIONS

This application is a national stage application under 35 U.S.C. 371 of PCT/CN2019/115010 filed Nov. 1, 2019, which is hereby expressly incorporated by reference herein in its entirety as if fully set forth below and for all applicable purposes.

BACKGROUND

Field of the Disclosure

Aspects of the present disclosure relate to wireless communications, and more particularly, to techniques for performing subband level precoding for uplink transmission.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the disclosure relate to a method for wireless communication by a user equipment (UE). The method generally includes receiving, from a network entity, information indicating at least one of a set of one or more frequency domain (FD) bases and linear combination coefficients, determining subband precoding based at least in part on linear combinations of the FD bases based on the linear combination coefficients, and transmitting a physical uplink shared channel (PUSCH) with the subband precoding.

Certain aspects of the disclosure relate to a method for wireless communication by a network entity. The method generally includes determining, at least one of a set of one or more frequency domain (FD) bases and linear combination coefficients, determining a subband precoder based at least in part on the at least one of the set of one or more FD bases and linear combination coefficients, transmitting, to the UE, information indicating at least one of the set of FDs and linear combination coefficients, and receiving, from the UE, a physical uplink shared channel (PUSCH) transmitted with subband precoding as linear combinations of the FD bases based on the linear combination coefficients.

Aspects of the present disclosure also provide various apparatuses, means, and computer readable including instructions for performing the operations described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 6 illustrates three tables showing example M values according to rank and layer, in accordance with certain aspects of the present disclosure.

FIG. 9 illustrates an example of wideband precoding for codebook based UL transmission.

FIG. 11 illustrates an example of wideband precoding for non-codebook based UL transmission.

FIGS. 12A-12F illustrate precoder matrix sets for various layer and antenna port combinations.

FIG. 16 illustrates example linear combinations of FD bases, in accordance with aspects of the present disclosure.

FIGS. 17A-17D illustrate examples scenarios for FD bases and linear combination coefficients, in accordance with aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
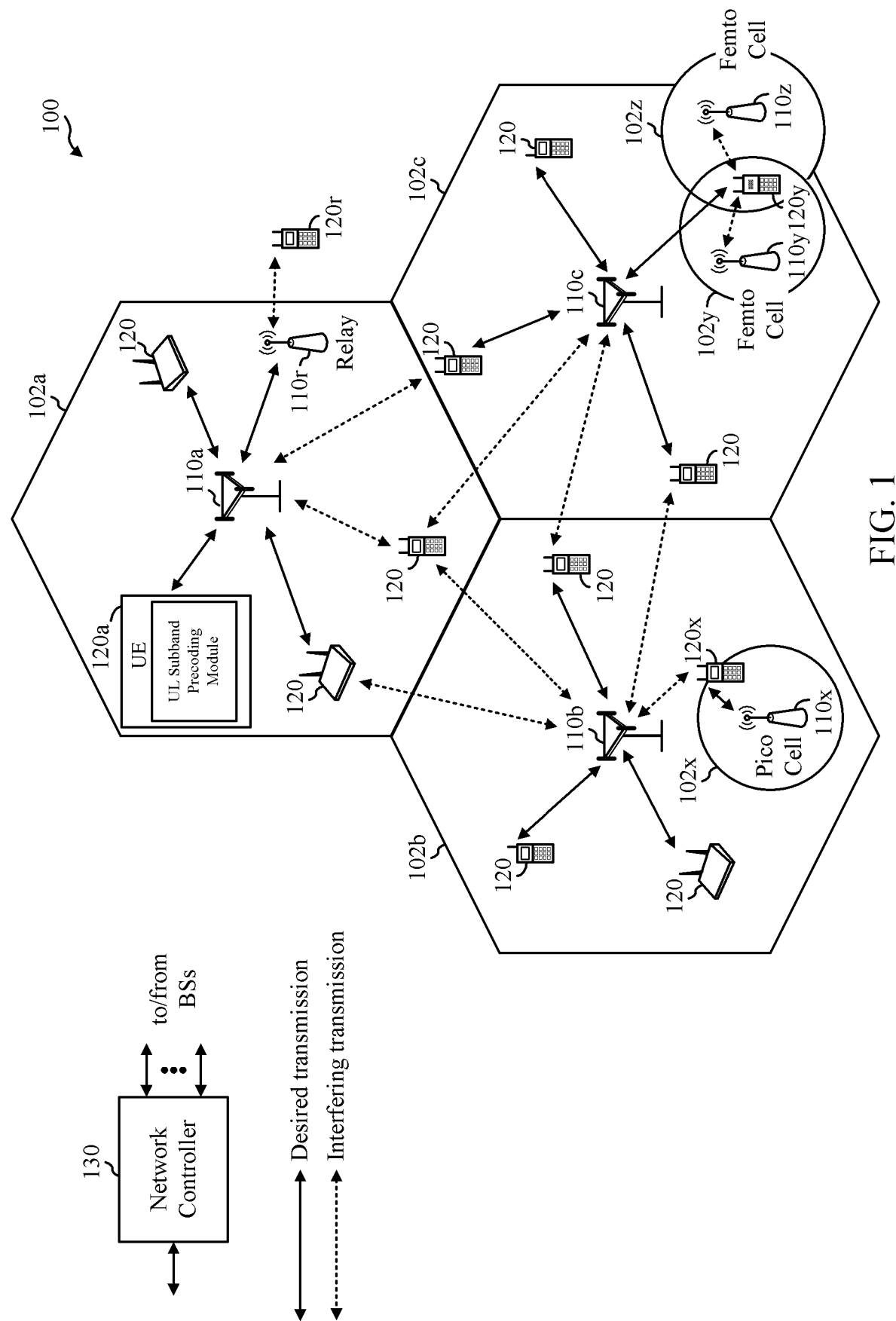
FIG. 1 is a block diagram conceptually illustrating an example telecommunications system, in accordance with certain aspects of the present disclosure.

Aspects of the present disclosure relate to wireless communications, and more particularly, to techniques for performing subband level precoding for uplink transmission.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, a UE 120 in the wireless communication network 100 may include an UL subband precoding module configured to perform (or assist the UE 120 in performing) operations 1300 described below with reference to FIG. 13. Similarly, a base station 120 (e.g., a gNB) may include an UL subband precoding module configured to perform (or assist the base station 120 in performing) operations 1400 described below with reference to FIG. 14.

As illustrated in FIG. 1, the wireless communication network 100 may include a number of base stations (BSs) 110 and other network entities. A BS may be a station that communicates with user equipment (UE). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into sub-bands. For example, a sub-band may cover 1.08 MHz (i.e., 6 resource blocks), and there may be 1, 2, 4, 8, or 16 sub-bands for system bandwidth of 1.25, 2.5, 5, 10 or 20 MHz, respectively.

Communication systems such as NR may utilize OFDM with a cyclic prefix (CP) on the uplink and downlink and include support for half-duplex operation using time division duplex (TDD). Beamforming may be supported and beam direction may be dynamically configured. MIMO transmissions with precoding may also be supported. MIMO configurations in the DL may support up to 8 transmit antennas with multi-layer DL transmissions up to 8 streams and up to 4 streams per UE. Multi-layer transmissions with up to 4 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
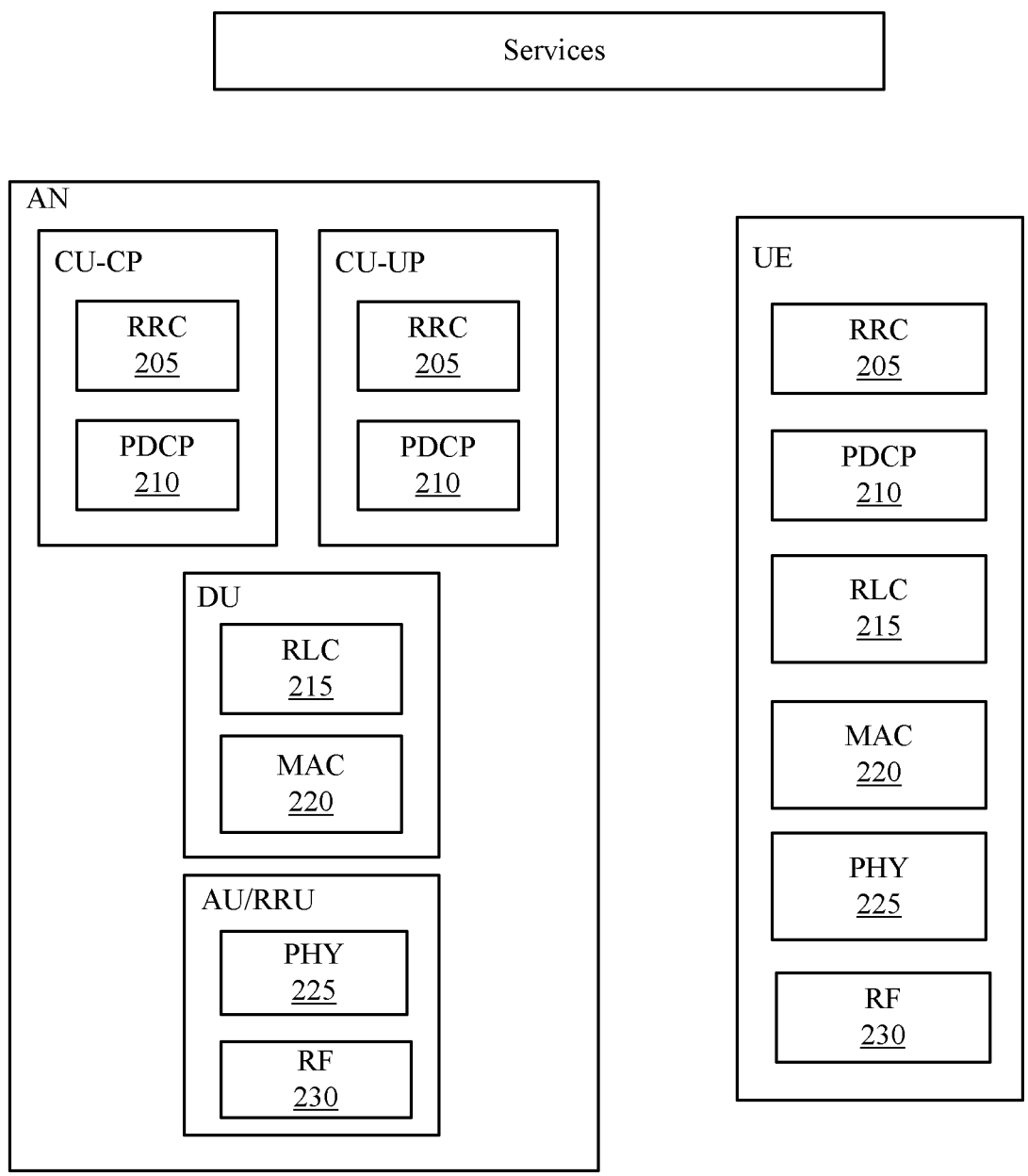
FIG. 2 is a block diagram showing examples for implementing a communication protocol stack in the example RAN architecture, in accordance with certain aspects of the present disclosure.

FIG. 2 illustrates a diagram showing examples for implementing a communications protocol stack in a RAN (e.g., such as the RAN 100), according to aspects of the present disclosure. The illustrated communications protocol stack 200 may be implemented by devices operating in a wireless communication system, such as a 5G NR system (e.g., the wireless communication network 100). In various examples, the layers of the protocol stack 200 may be implemented as separate modules of software, portions of a processor or ASIC, portions of non-collocated devices connected by a communications link, or various combinations thereof. Collocated and non-collocated implementations may be used, for example, in a protocol stack for a network access device or a UE. As shown in FIG. 2, the system may support various services over one or more protocols. One or more protocol layers of the protocol stack 200 may be implemented by the AN and/or the UE.

As shown in FIG. 2, the protocol stack 200 is split in the AN (e.g., BS 110 in FIG. 1). The RRC layer 205, PDCP layer 210, RLC layer 215, MAC layer 220, PHY layer 225, and RF layer 230 may be implemented by the AN. For example, the CU-CP may implement the RRC layer 205 and the PDCP layer 210. A DU may implement the RLC layer 215 and MAC layer 220. The AU/RRU may implement the PHY layer(s) 225 and the RF layer(s) 230. The PHY layers 225 may include a high PHY layer and a low PHY layer.

The UE may implement the entire protocol stack 200 (e.g., the RRC layer 205, the PDCP layer 210, the RLC layer 215, the MAC layer 220, the PHY layer(s) 225, and the RF layer(s) 230).

Figure 3:
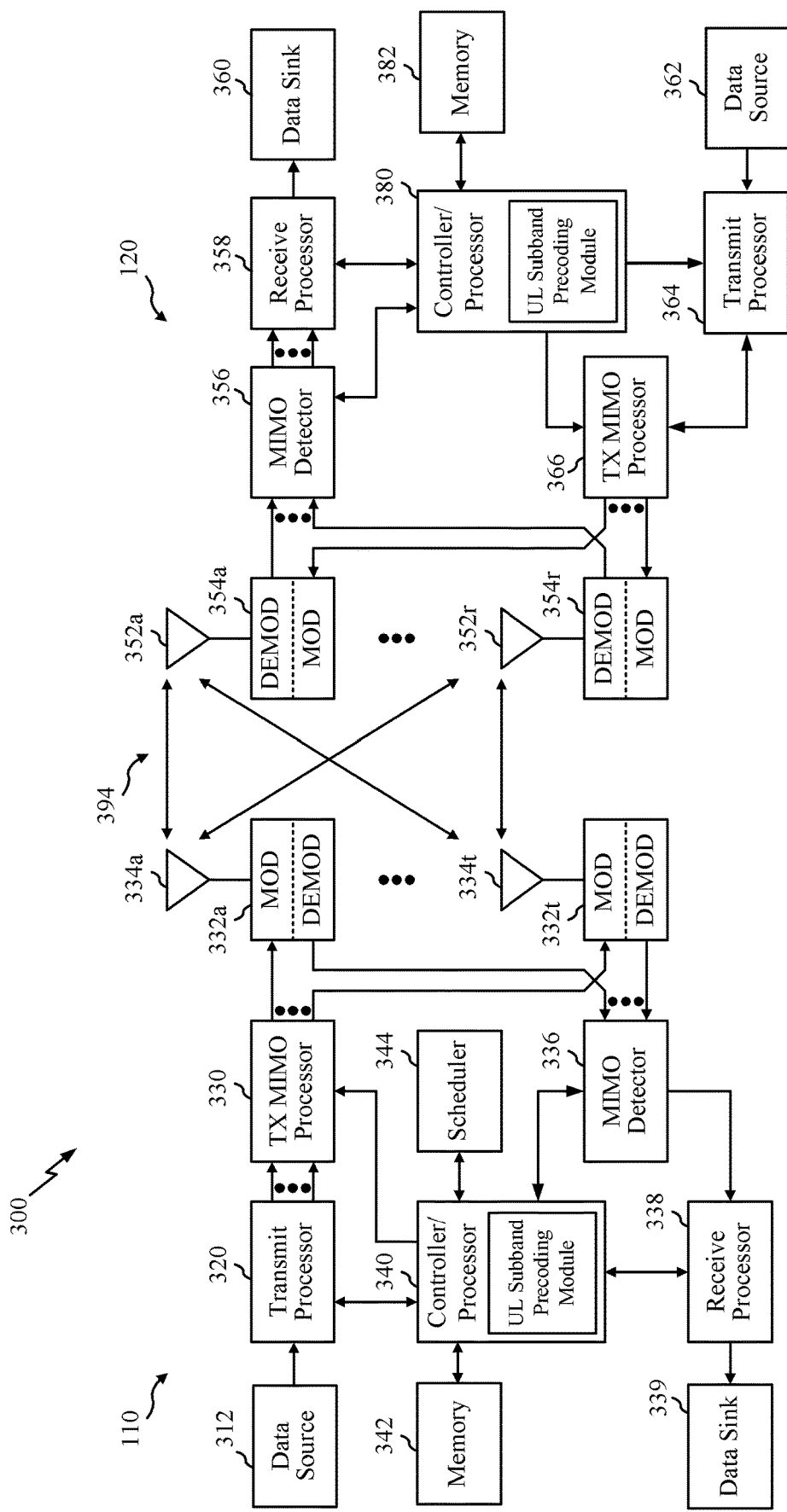
FIG. 3 is a block diagram conceptually illustrating a design of an example base station (BS) and user equipment (UE), in accordance with certain aspects of the present disclosure.

FIG. 3 illustrates example components of BS 110 and UE 120 (as depicted in FIG. 1), which may be used to implement aspects of the present disclosure. For example, antennas 352, processors 366, 358, 364, and/or controller/processor 380 of the UE 120 may be configured (or used) to perform operations 1300 of FIG. 3 and/or antennas 334, processors 320, 330, 338, and/or controller/processor 340 of the BS 110 may be configured (or used) to perform operations 1400 described below with reference to FIG. 14.

At the BS 110, a transmit processor 320 may receive data from a data source 312 and control information from a controller/processor 340. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 320 may process (e.g., encode and symbol map) the data and control information to obtain data symbols and control symbols, respectively. The processor 320 may also generate reference symbols, e.g., for the primary synchronization signal (PSS), secondary synchronization signal (SSS), and cell-specific reference signal (CRS). A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the base station 110 and may provide received signals to the demodulators (DEMODs) in transceivers 354a through 354r, respectively. Each demodulator 354 may condition (e.g., filter, amplify, down-convert, and digitize) a respective received signal to obtain input samples. Each demodulator may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, de-interleave, and decode) the detected symbols, provide decoded data for the UE 120 to a data sink 360, and provide decoded control information to a controller/processor 380.

In a MIMO system, a transmitter (e.g., BS 120) includes multiple transmit antennas 354a through 354r, and a receiver (e.g., UE 110) includes multiple receive antennas 352a through 352r. Thus, there are a plurality of signal paths 394 from the transmit antennas 354a through 354r to the receive antennas 352a through 352r. Each of the transmitter and the receiver may be implemented, for example, within a UE 110, a BS 120, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system is limited by the number of transmit or receive antennas, whichever is lower. In addition, the channel conditions at the UE, as well as other considerations, such as the available resources at the base station, may also affect the transmission rank. For example, the rank (and therefore, the number of transmission layers) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

On the uplink, at UE 120, a transmit processor 364 may receive and process data (e.g., for the physical uplink shared channel (PUSCH)) from a data source 362 and control information (e.g., for the physical uplink control channel (PUCCH) from the controller/processor 380. The transmit processor 364 may also generate reference symbols for a reference signal (e.g., for the sounding reference signal (SRS)). The symbols from the transmit processor 364 may be precoded by a TX MIMO processor 366 if applicable, further processed by the demodulators in transceivers 354a through 354r (e.g., for SC-FDM, etc.), and transmitted to the base station 110. At the BS 110, the uplink signals from the UE 120 may be received by the antennas 334, processed by the modulators 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340 and 380 may direct the operation at the BS 110 and the UE 120, respectively. The processor 340 and/or other processors and modules at the BS 110 may perform or direct the execution of processes for the techniques described herein. The memories 342 and 382 may store data and program codes for BS 110 and UE 120, respectively. A scheduler 344 may schedule UEs for data transmission on the downlink and/or uplink.

Figure 4:
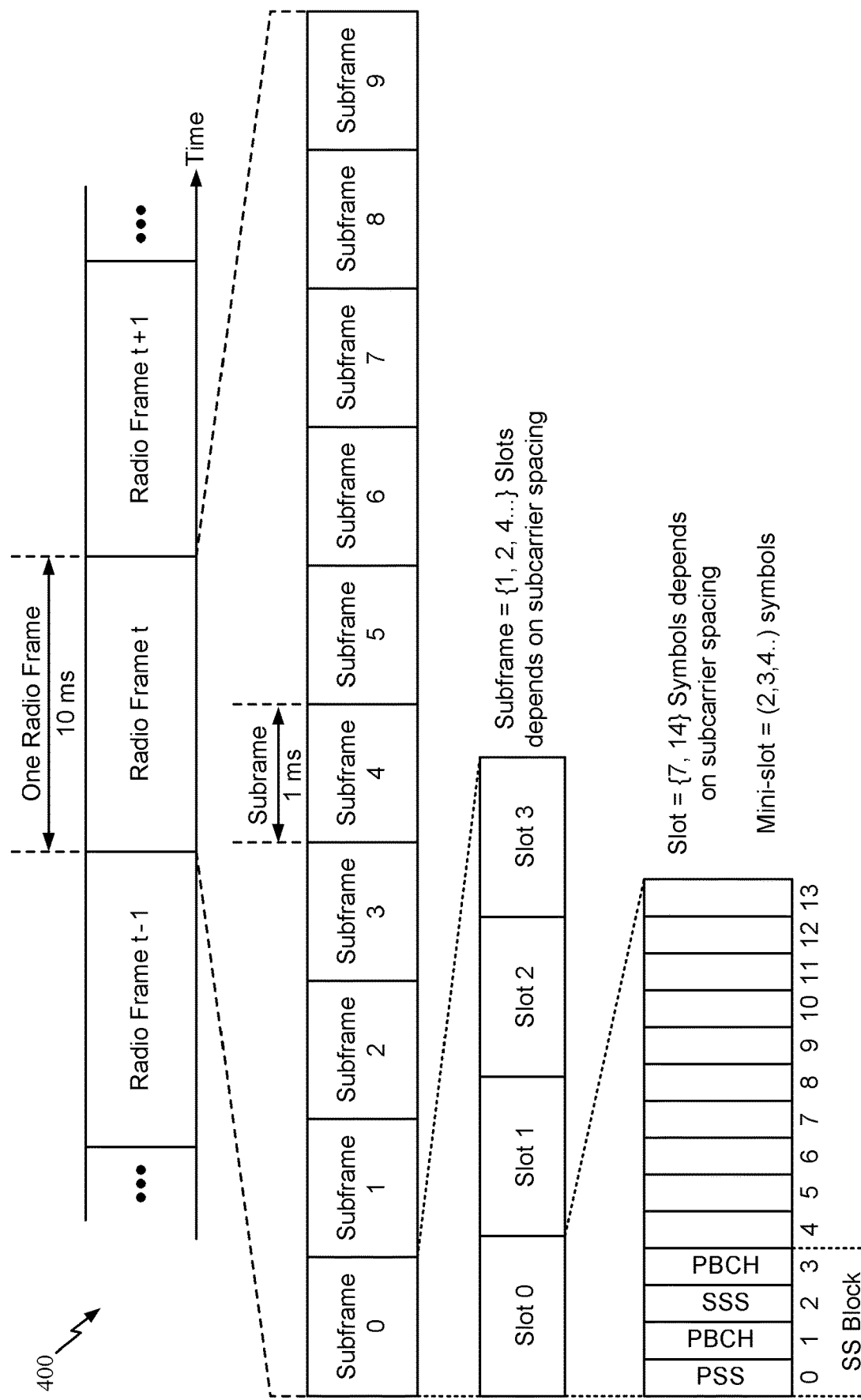
FIG. 4 illustrates an example of a frame format for a telecommunication system, in accordance with certain aspects of the present disclosure.

FIG. 4 is a diagram showing an example of a frame format 400 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 4. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example CSI Report Configuration

Channel state information (CSI) may refer to channel properties of a communication link. The CSI may represent the combined effects of, for example, scattering, fading, and power decay with distance between a transmitter and receiver. Channel estimation using pilots, such as CSI reference signals (CSI-RS), may be performed to determine these effects on the channel. CSI may be used to adapt transmissions based on the current channel conditions, which is useful for achieving reliable communication, in particular, with high data rates in multi-antenna systems. CSI is typically estimated at the receiver, quantized, and fed back to the transmitter.

The time and frequency resources that can be used by the UE to report CSI are controlled by a base station (e.g., gNB). CSI may include Channel Quality Indicator (CQI), precoding matrix indicator (PMI), CSI-RS resource indicator (CRI), SS/PBCH Block Resource indicator (SSBRI), layer indicator (LI), rank indicator (RI) and/or L1-RSRP. However, as described below, additional or other information may be included in the report.

The base station may configure UEs for CSI reporting. For example, the BS configures the UE with a CSI report configuration or with multiple CSI report configurations. The CSI report configuration may be provided to the UE via higher layer signaling, such as radio resource control (RRC) signaling (e.g., CSI-ReportConfig). The CSI report configuration may be associated with CSI-RS resources for channel measurement (CM), interference measurement (IM), or both. The CSI report configuration configures CSI-RS resources for measurement (e.g., CSI-ResourceConfig). The CSI-RS resources provide the UE with the configuration of CSI-RS ports, or CSI-RS port groups, mapped to time and frequency resources (e.g., resource elements (REs)). CSI-RS resources can be zero power (ZP) or non-zero power (NZP) resources. At least one NZP CSI-RS resource may be configured for CM.

For the Type II single panel codebook, the PMI is a linear combination of beams; it has a subset of orthogonal beams to be used for linear combination and has per layer, per polarization, amplitude and phase for each beam. For the PMI of any type, there can be wideband (WB) PMI and/or subband (SB) PMI as configured.

The CSI report configuration may configure the UE for aperiodic, periodic, or semi-persistent CSI reporting. For periodic CSI, the UE may be configured with periodic CSI-RS resources. Periodic CSI and semi-persistent CSI report on physical uplink control channel (PUCCH) may be triggered via RRC or a medium access control (MAC) control element (CE). For aperiodic and semi-persistent CSI on the physical uplink shared channel (PUSCH), the BS may signal the UE a CSI report trigger indicating for the UE to send a CSI report for one or more CSI-RS resources, or configuring the CSI-RS report trigger state (e.g., CSI-AperiodicTriggerStateList and CSI-SemiPersistentOnPUSCH-TriggerStateList). The CSI report trigger for aperiodic CSI and semi-persistent CSI on PUSCH may be provided via downlink control information (DCI). The CSI-RS trigger may be signaling indicating to the UE that CSI-RS will be transmitted for the CSI-RS resource.

The UE may report the CSI feedback based on the CSI report configuration and the CSI report trigger. For example, the UE may measure the channel associated with CSI for the triggered CSI-RS resources. Based on the measurements, the UE may select a preferred CSI-RS resource. The UE reports the CSI feedback for the selected CSI-RS resource. LI may be calculated conditioned on the reported CQI, PMI, RI and CRI; CQI may be calculated conditioned on the reported PMI, RI and CRI; PMI may be calculated conditioned on the reported RI and CRI; and RI may be calculated conditioned on the reported CRI.

Each CSI report configuration may be associated with a single downlink bandwidth part (BWP). The CSI report setting configuration may define a CSI reporting band as a subset of subbands of the BWP. The associated DL BWP may indicated by a higher layer parameter (e.g., bwp-Id) in the CSI report configuration for channel measurement and contains parameter(s) for one CSI reporting band, such as codebook configuration, time-domain behavior, frequency granularity for CSI, measurement restriction configurations, and the CSI-related quantities to be reported by the UE. Each CSI resource setting may be located in the DL BWP identified by the higher layer parameter, and all CSI resource settings may be linked to a CSI report setting have the same DL BWP.

In certain systems, the UE can be configured via higher layer signaling (e.g., in the CSI report configuration) with one out of two possible subband sizes (e.g., reportFreqConfiguration contained in a CSI-ReportConfig) which indicates a frequency granularity of the CSI report, where a subband may be defined as $N_{PRB}^{SB}$ contiguous physical resource blocks (PRBs) and depends on the total number of PRBs in the bandwidth part. The UE may further receive an indication of the subbands for which the CSI feedback is requested. In some examples, a subband mask is configured for the requested subbands for CSI reporting. The UE computes precoders for each requested subband and finds the PMI that matches the computed precoder on each of the subbands.

Compressed CSI Feedback Coefficient Reporting

As discussed above, a user equipment (UE) may be configured for channel state information (CSI) reporting, for example, by receiving a CSI configuration message from the base station. In certain systems (e.g., Release 15 5G NR), the UE may be configured to report at least a Type II precoder across configured frequency domain (FD) units. For example, the precoder matrix $W_r$ for layer r includes the $W_1$ matrix, reporting a subset of selected beams using spatial compression and the $W_{2,r}$ matrix, reporting (for cross-polarization) the linear combination coefficients for the selected beams (2L) across the configured FD units:

$$W_r = \sum_{i=0}^{2L-1} b_i \cdot c_i, \text{ where } c_i = \begin{bmatrix} c_{i,0} \cdots c_{i,N_3-1} \\ N_3 \end{bmatrix},$$

where $b_i$ is the selected beam, $c_i$ is the set of linear combination coefficients (i.e., entries of $W_{2,r}$ matrix), L is the number of selected spatial beams, and $N_3$ corresponds to the number of frequency units (e.g., subbands, resource blocks (RBs), etc.). In certain configurations, L is RRC configured. The precoder is based on a linear combination of DFT beams. The Type II codebook may improve MU-MIMO performance. In some configurations considering there are two polarizations, the $W_{2,r}$ matrix has size $2L \times N_3$.

Figure 5:
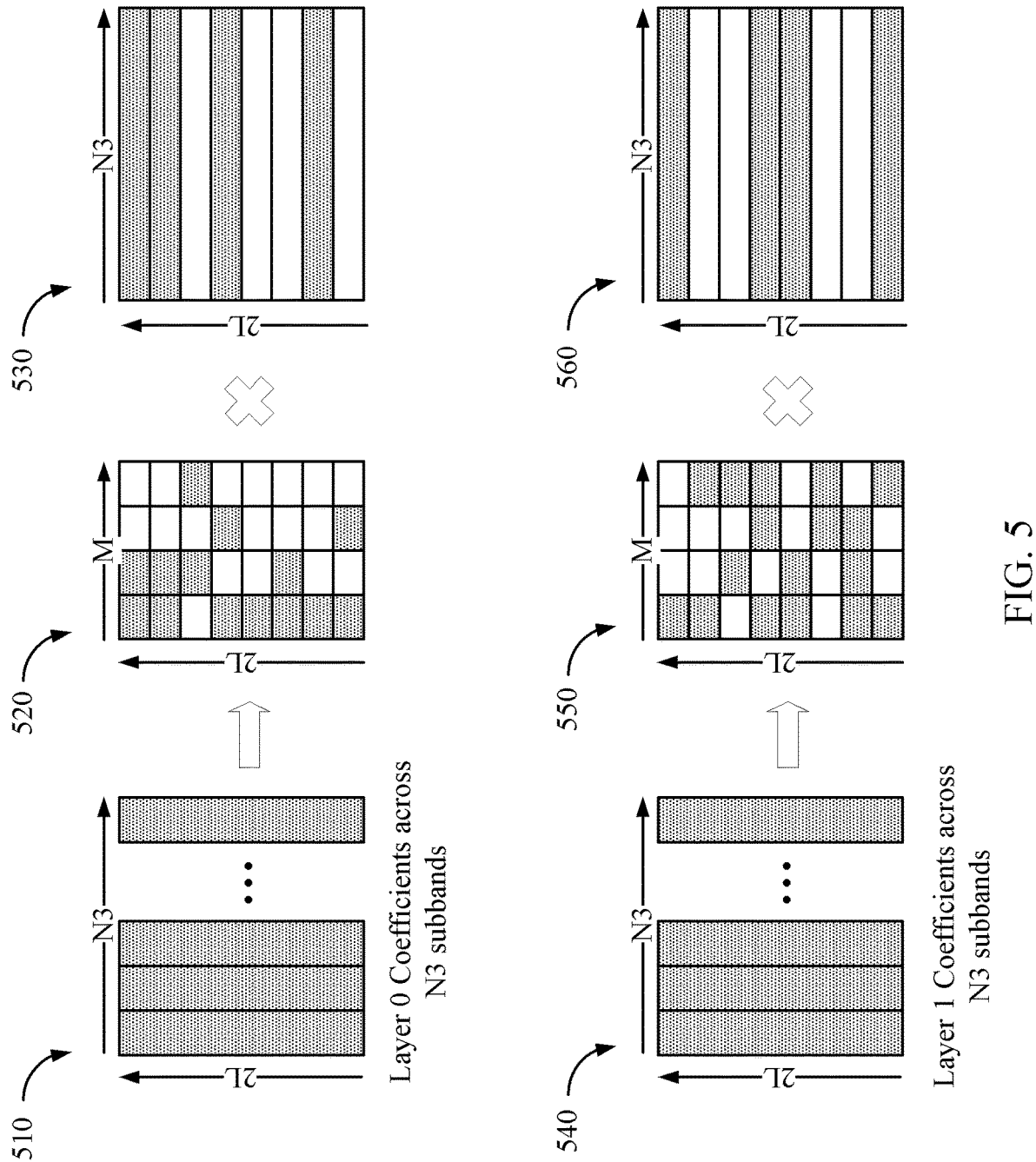
FIG. 5 illustrates a conceptual example of a first precoder matrix for transmission layer 0 and a second precoder matrix for transmission layer 1, in accordance with certain aspects of the present disclosure.

In certain systems (e.g., Rel-16 5G NR), the UE may be configured to report FD compressed precoder feedback to reduce overhead of the CSI report. As shown in FIG. 5, the precoder matrix ($W_{2,i}$) for layer i with i=0,1 may use an FD compression $W_{f,i}^H$ matrix to compress the precoder matrix into $\tilde{W}_{2,i}$ matrix size to $2L \times M$ (where M is network configured and communicated in the CSI configuration message via RRC or DCI, and $M<N_3$) given as:

$$W_i = W_1 \tilde{W}_{2,i} W_{f,i}^H$$

Where the precoder matrix $W_i$ (not shown) has $P=2N_1N_2$ rows (spatial domain, number of ports) and $N_3$ columns (frequency-domain compression unit containing RBs or reporting sub-bands), and where M bases are selected for each of layer 0 and layer 1 independently. The $\tilde{W}_{2,0}$ matrix 520 consists of the linear combination coefficients (amplitude and co-phasing), where each element represents the coefficient of a tap for a beam. The $\tilde{W}_{2,0}$ matrix 520 as shown is defined by size $2L \times M$, where one row corresponds to one spatial beam in $W_1$ (not shown) of size $P \times 2L$ (where L is network configured via RRC), and one entry therein represents the coefficient of one tap for this spatial beam. The UE may be configured to report (e.g., CSI report) a subset $K_0 < 2LM$ of the linear combination coefficients of the $\tilde{W}_{2,0}$ matrix 520. For example, the UE may report $K_{NZ,i} \leq K_0$ coefficients (where $K_{NZ,i}$ corresponds to a maximum number of non-zero coefficients for layer-i with i=0 or 1, and $K_0$ is network configured via RRC) illustrated as shaded squares (unreported coefficients are set to zero). In some configurations, an entry in the $\tilde{W}_{2,0}$ matrix 520 corresponds to a row of $W_{f,0}^H$ matrix 530. In the example shown, both the $\tilde{W}_{2,0}$ matrix 520 at layer 0 and the $\tilde{W}_{2,0}$ matrix 550 at layer 1 are $2L \times M$.

The $W_{f,0}^H$ matrix 530 is composed of the basis vectors (each row is a basis vector) used to perform compression in frequency domain. In the example shown, both the $W_{f,0}^H$ matrix 530 at layer 0 and the $W_{f,1}^H$ matrix 560 at layer 1 include M=4 FD basis (illustrated as shaded rows) from $N_3$ candidate DFT basis. In some configurations, the UE may report a subset of selected basis of the $W_{f,i}^H$ matrix via CSI report. The M bases specifically selected at layer 0 and layer 1. That is, the M bases selected at layer 0 can be same/partially-overlapped/non-overlapped with the M bases selected at layer 1.

Frequency Domain Compression for High Rank Indication

FIG. 6 illustrates three alternative examples for determining the FD basis for a particular RI. Each example is illustrated as a table having a left column indicative of an RI (e.g., RI={1, 2, 3, 4}), and a bottom row indicative of a transmission layer (e.g., layer 0, layer 1, layer 2, layer 3). That is, the number of layers indicate a transmission rank, where RI=1 is limited to a single spatial layer, RI=2 corresponds to two spatial layers, RI=3 corresponds to three spatial layers, and RI=4 corresponds to four spatial layers. Accordingly, type II CSI may relate to UEs having up to four spatial layers.

In some configurations using FD compression, regardless of the rank, up to K0 non-zero coefficients (NZCs) are reported each layer, and the total number of NZCs across all layers is constrained at 2K0. That is, for rank-1 and rank-2, only the per-layer constraint needs to be considered, as the total NZCs constraint across layers become redundant (since the total NZCs of the two layers, constrained at K0 each, cannot exceed 2K0). For rank-3 and rank-4, on the other hand, both the per-layer constraint and the total constraint would be considered.

Similarly, the FD basis ($M_i$) for RI={3, 4} is comparable to RI=2. In one example, each layer (layer 0 and layer 1) of RI=2 uses M number of FD basis, making the FD basis across all four layers of RI=4 comparable to 2M. That is, $M_i$ for a given RI can be described as:

$$\sum_{i=0}^{RI-1} M_i \approx 2M$$

In the example shown in FIG. 5, the $W_{f,0}^H$ matrix 530 includes FD basis M=4 ($M_0$=4), and the $W_{f,1}^H$ matrix 560 includes FD basis M=4 ($M_1$=4), making a total of 8 FD bases for RI=2. Thus, for RI={3,4} the total number of FD bases across all four layers should be comparable to $M_0+M_1$ or 2M (e.g., between 6 and 10 FD basis for RI={3, 4}).

As shown in FIG. 6, table 610 illustrates an example for making the total number of FD basis for RI={3, 4} comparable to RI=2. In this example, the FD basis for each of layers 0-3 is M2 for RI={3, 4}. In some cases, M2 may be set in a standard specification equal to M/2 or ⅔*M. The M value may be determined, for example, by the following equation:

$$M = \text{ceil}(p*N3),$$

while M2 may be determined by the following equation:

$$M2 = \text{ceil}(v0*N3),$$

where p and v0 are jointly configured, for example from:

$$(p, v0) = (½, ¼), (¼, ¼) \text{ and } (¼, ⅛).$$

In aspects of the techniques described herein, a UE may be configured for CSI reporting, for example, by receiving a CSI configuration message from a base station. In certain systems, the UE may be configured to report at least a Type II precoder across configured frequency domain (FD) units. For example, a precoder for a certain layer l on $N_3$ subbands may be expressed as a size-$P \times N_3$ matrix $W_l$:

$$W_l = \begin{bmatrix} \sum_{i=0}^{L-1} \sum_{m=0}^{M_l-1} v_{m_1^{(i)}, m_2^{(i)}} p_{i,m}^{(1)} p_{i,m}^{(2)} \varphi_{i,m} \cdot f_{m_3^{(m)}}^H \\ \sum_{i=0}^{L-1} \sum_{m=0}^{M_l-1} v_{m_1^{(i)}, m_2^{(i)}} p_{i+L,m}^{(1)} p_{i+L,m}^{(2)} \varphi_{i+L,m} \cdot f_{m_3^{(m)}}^H \end{bmatrix},$$

In this equation, L is the number of spatial domain (SD) basis (or bases) (e.g., spatial beams) configured by RRC signaling of the CSI report configuration, $v_{m_1^{(i)},m_2^{(i)}}$ with $i=0,1,\ldots,L-1$ is a P/2×1 SD basis and it is applied to both polarizations. The SD bases are DFT based and the SD basis with index $m_1^{(i)}$ and $m_2^{(i)}$ may be written as:

$$v_{m_1^{(i)} m_2^{(i)}} = \left[ u_{m_2^{(i)}} \; e^{\frac{j2\pi m_1^{(i)}}{O_1 N_1}} u_{m_2^{(i)}} \; \ldots \; e^{\frac{j2\pi m_1^{(i)}(N_1-1)}{O_1 N_1}} u_{m_2^{(i)}} \right]^T,$$

$$u_{m_2^{(i)}} = \left[ 1 \; e^{\frac{j2\pi m_2^{(i)}}{O_2 N_2}} \; \ldots \; e^{\frac{j2\pi m_2^{(i)}(N_2-1)}{O_2 N_2}} \right].$$

In this equation, $N_1$ and $N_2$ represents the first and the second dimension of the configured codebook, respectively. In some cases, these parameters may refer to the number of antenna elements on the vertical and horizontal dimension at the base station, respectively. The oversampling factors are denoted by $O_1$ and $O_2$.

Moreover, $f_{m_3^{(m)}}$ with $m=0, 1, \ldots M_l$ is a $N_3 \times 1$ FD basis (i.e., $f_{m_3^{(m)}}^H$ is a $1 \times N_3$ row vector) which may also be known as the transferred domain basis. $M_l$ is the number of FD bases selected for layer l and it is derived based on RRC configuration. In some cases, for each layer of rank-1 and rank-2, there are M bases and value of $$M = \left\lceil p \times \frac{N_3}{R} \right\rceil$$

is determined by a ratio p configured by RRC and R is the number of precoding matrix indicator (PMI) subbands within one CQI subband. The FD bases may be DFT bases, and the FD basis with index $m_3^{(m)} \in \{0,1, \ldots N_3-1\}$ is expressed as:

$$f_{m_3^{(m)}} = \left[ 1 \; e^{\frac{j2\pi m_3^{(m)}}{N_3}} \; \ldots \; e^{\frac{j2\pi m_3^{(m)}(N_3-1)}{N_3}} \right].$$

As noted above, linear combination coefficient may include three parts: $p_{i,l,m}^{(1)}$, $p_{i,l,m}^{(2)}$, $\varphi_{i,l,m}$. The parameter $p_{i,l,m}^{(1)}$ represents an amplitude reference for the first polarization, while $p_{i+L,l,m}^{(1)}$ represents the amplitude reference for the second polarization. These values are common to all the coefficients associated with the corresponding polarization (e.g., $p_{i,l,m}^{(1)} = p_{i',l,m}^{(1)}$, and $p_{i+L,l,m}^{(1)} = p_{i'+L,l,m'}^{(1)}$, $\forall i' \in \{i' \neq i | i'=0,1, \ldots L-1\}$, $\forall m' \in \{m' \neq m | m'=0,1, \ldots M\}$). The parameter $p_{i,l,m}^{(2)}$ represents a (differential) amplitude the coefficient associated with SD basis with index $m_1^{(i)}$ and $m_2^{(i)}$, and associated with the FD basis with index $m_3^{(m)}$ in the first polarization, while $p_{i+L,m}^{(2)}$ represents a (differential) amplitude the coefficient associated with SD basis with index $m_1^{(i)}$ and $m_2^{(i)}$, and associated with the FD basis with index $m_3^{(m)}$ in the second polarization. Similarly, the parameter $\varphi_{i,m}$ represents a (differential) amplitude the coefficient associated with SD basis with index $m_1^{(i)}$ and $m_2^{(i)}$, and associated with the FD basis with index $m_3^{(m)}$ in the first polarization, while $\varphi_{i+L,m}$ represents a (differential) amplitude the coefficient associated with SD basis with index $m_1^{(i)}$ and $m_2^{(i)}$, and associated with the FD basis with index $m_3^{(m)}$ in the second polarization.

For RI={1,2}, for each layer, the number of FD bases $M=M_{1,2}$, wherein the value of $$M_{1,2} = \left\lceil p \times \frac{N_3}{R} \right\rceil$$

is determined by a ratio p configured by RRC and R is the number of precoding matrix indicator (PMI) subbands within one CQI subband. For RI={3,4}, the number of FD bases $M=M_{3,4}$, wherein the value of $$M_{3,4} = \left\lceil v_0 \times \frac{N_3}{R} \right\rceil$$

is determined by a ratio $v_0$ configured by RRC. Possible combinations of p and $v_0$ include $$(p, v_0) = \left(\frac{1}{2}, \frac{1}{4}\right), \left(\frac{1}{4}, \frac{1}{4}\right), \left(\frac{1}{4}, \frac{1}{8}\right).$$

Moreover, for each layer of RI={1,2,3,4}, the UE is configured to report a subset of total $2LM_{1,2}$ or total $2LM_{3,4}$ coefficients, the unreported coefficients are set to zero. The max number of coefficients to be reported per layer is $K_0$ and the max total number of coefficients to be reported across all layers is $2K_0$, where $K_0 = \lceil \beta \times 2LM_{1,2} \rceil$ and $$\beta = \left\{\frac{1}{4}, \frac{1}{2}, \frac{3}{4}\right\}$$

is RRC configured. It may be noted that, regardless of rank, $K_0$ is calculated using the $M_{1,2}$.

With codebook operation with FD compression, for a layer l, its precoder across $N_3$ FD units (a.k.a. PMI subbands) is given by a size-$N_t \times N_3$ matrix $W_l$ as follows:

$$W_l = W_1 \times \tilde{W}_{2,l} \times W_{f,l}^H,$$

Where $W_1$, $\tilde{W}_2$ and $W_f$ are as follows:

| Notation | size | description | Comment |
|---|---|---|---|
| $W_1$ | $N_t \times 2L$ | SD basis; same SD bases are applied to both polarizations | Layer-common |
| $\tilde{W}_{2,l}$ | $2L \times M$ | Coefficient matrix: Consist of max $K_0$ NZC per-layer; Consist of max $2K_0$ NZC across all layers | Layer-specific; |
| $W_{f,l}$ | $M \times N_3$ | FD basis; same M FD bases are applied to both polarizations | Layer-specific; |

Note:

L value is rank-common and layer-common

M value is rank-group specific and layer-common. $M = M_{1,2}$ for RI = {1,2} and $M = M_{3,4} \leq M_{1,2}$ for RI = {3,4}

Figure 7:
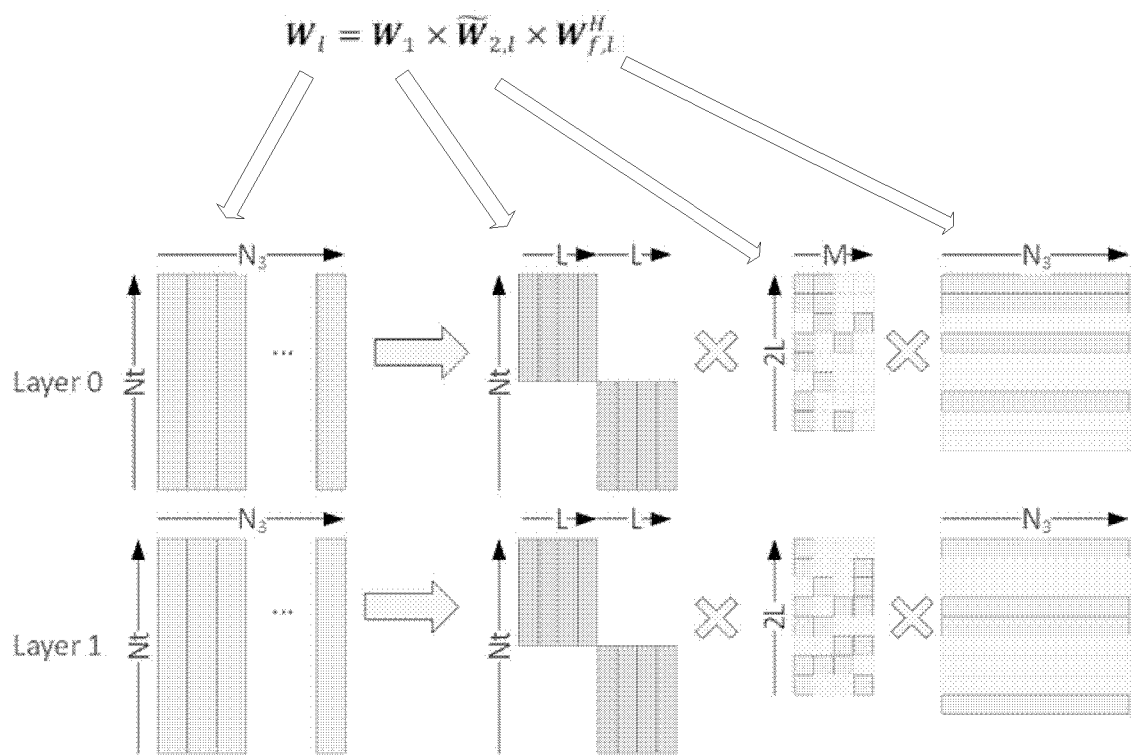
FIG. 7 illustrates graphically various matrices.

These three matrices, illustrated graphically in FIG. 7 (it should be noted that while FIG. 7 only show two layers, it can be actually 3 or 4 layers with same structure, with the only difference being in the number of FD bases and number of non-zero coefficients or NZCs), can be written as:

$$W_1 = \begin{bmatrix} v_{m_1^{(0)},m_2^{(0)}}, v_{m_1^{(1)},m_2^{(1)}}, \cdots, v_{m_1^{(L-1)},m_2^{(L-1)}} & \\ & v_{m_1^{(0)},m_2^{(0)}}, v_{m_1^{(1)},m_2^{(1)}}, \cdots, v_{m_1^{(L-1)},m_2^{(L-1)}} \end{bmatrix}$$

$$W_{f,l}^H = \begin{bmatrix} f_{m_{3,l}^{(0)}}^H \\ f_{m_{3,l}^{(1)}}^H \\ \vdots \\ f_{m_{3,l}^{(M-1)}}^H \end{bmatrix}$$

$$\tilde{W}_{2,l} = \begin{bmatrix} p_{0,l,0}^{(1)} p_{0,l,0}^{(2)} e^{j\phi_{0,l,0}} & p_{0,l,1}^{(1)} p_{0,l,1}^{(2)} e^{j\phi_{0,l,1}} & \cdots & p_{0,l,M-1}^{(1)} p_{0,l,M-1}^{(2)} e^{j\phi_{0,l,M-1}} \\ p_{1,l,0}^{(1)} p_{1,l,0}^{(2)} e^{j\phi_{1,l,0}} & p_{1,l,1}^{(1)} p_{1,l,1}^{(2)} e^{j\phi_{0,l,1}} & \cdots & p_{1,l,M-1}^{(1)} p_{1,l,M-1}^{(2)} e^{j\phi_{1,l,M-1}} \\ \vdots & \vdots & \ddots & \vdots \\ p_{L-1,l,0}^{(1)} p_{L-1,l,0}^{(2)} e^{j\phi_{L-1,l,0}} & p_{L-1,l,1}^{(1)} p_{L-1,l,1}^{(2)} e^{j\phi_{L-1,l,1}} & \cdots & p_{L-1,l,M-1}^{(1)} p_{L-1,l,M-1}^{(2)} e^{j\phi_{L-1,l,M-1}} \\ p_{L,l,0}^{(1)} p_{L,l,0}^{(2)} e^{j\phi_{L,l,0}} & p_{L,l,1}^{(1)} p_{L,l,1}^{(2)} e^{j\phi_{L,l,1}} & \cdots & p_{L,l,M-1}^{(1)} p_{L,l,M-1}^{(2)} e^{j\phi_{L,l,M-1}} \\ p_{L+1,l,0}^{(1)} p_{L+1,l,0}^{(2)} e^{j\phi_{L+1,l,0}} & p_{L+1,l,1}^{(1)} p_{L+1,l,1}^{(2)} e^{j\phi_{L+1,l,1}} & \cdots & p_{L+1,l,M-1}^{(1)} p_{L+1,l,M-1}^{(2)} e^{j\phi_{L+1,l,M-1}} \\ \vdots & \vdots & \ddots & \vdots \\ p_{2L-1,l,0}^{(1)} p_{2L-1,l,0}^{(2)} e^{j\phi_{2L-1,l,0}} & p_{2L-1,l,1}^{(1)} p_{2L-1,l,1}^{(2)} e^{j\phi_{2L-1,l,1}} & \cdots & p_{2L-1,l,M-1}^{(1)} p_{2L-1,l,M-1}^{(2)} e^{j\phi_{2L-1,l,M-1}} \end{bmatrix}$$

Where the SD bases are DFT based and the SD basis with index $m_1^{(i)}$ and $m_2^{(i)}$ is written as $$v_{m_1^{(i)},m_2^{(i)}} = \left[ u_{m_2^{(i)}} \quad e^{\frac{j2\pi m_1^{(i)}}{O_1 N_1}} u_{m_2^{(i)}} \quad \cdots \quad e^{\frac{j2\pi m_1^{(i)}(N_1-1)}{O_1 N_1}} u_{m_2^{(i)}} \right]^T,$$

$$u_{m_2^{(i)}} = \left[ 1 \quad e^{\frac{j2\pi m_2^{(i)}}{O_2 N_2}} \quad \cdots \quad e^{\frac{j2\pi m_2^{(i)}(N_2-1)}{O_2 N_2}} \right]$$

The FD bases may be DFT bases, and the FD basis with index $m_3^{(m)} \in \{0,1, \ldots N_3-1\}$ is expressed as:

$$f_{m_{3,l}^{(m)}}^H = \left[ 1 \quad e^{\frac{j2\pi m_{3,l}^{(m)}}{N_3}} \quad \cdots \quad e^{\frac{j2\pi m_{3,l}^{(m)}(N_3-1)}{N_3}} \right].$$

The coefficients $p_{i,m,l}^{(1)}$, $p_{i,m,l}^{(2)}$ and $\varphi_{i,m,l}$ may be described as follows.

| Notation | description | Alphabet |
|---|---|---|
| $p_{i,m,l}^{(1)}$ | Reference amplitude for the $1^{st}$ polarization. $p_{i,m,l}^{(1)} = p_{i',m',l}^{(1)}$, $\forall i' \neq i, m' \neq m$ | $\left\{ 1, \left(\frac{1}{2}\right)^{\frac{1}{4}}, \left(\frac{1}{2}\right)^{\frac{1}{2}}, \left(\frac{1}{2}\right)^{\frac{3}{4}}, \left(\frac{1}{2}\right)^{1}, \left(\frac{1}{2}\right)^{\frac{5}{4}}, \left(\frac{1}{2}\right)^{\frac{3}{2}}, \left(\frac{1}{2}\right)^{\frac{7}{4}}, \left(\frac{1}{2}\right)^{2}, \left(\frac{1}{2}\right)^{\frac{9}{4}}, \left(\frac{1}{2}\right)^{\frac{5}{2}}, \left(\frac{1}{2}\right)^{\frac{11}{4}}, \left(\frac{1}{2}\right)^{3}, \left(\frac{1}{2}\right)^{\frac{13}{4}}, \left(\frac{1}{2}\right)^{\frac{7}{2}} \right\}$ |
| $p_{i+L,m,l}^{(1)}$ | Reference amplitude for the $2^{nd}$ polarization. $p_{i+L,m,l}^{(1)} = p_{i'+L,m',l}^{(1)}$, $\forall i' \neq i, m' \neq m$ | $\left\{ 1, \left(\frac{1}{2}\right)^{\frac{1}{4}}, \left(\frac{1}{2}\right)^{\frac{1}{2}}, \left(\frac{1}{2}\right)^{\frac{3}{4}}, \left(\frac{1}{2}\right)^{1}, \left(\frac{1}{2}\right)^{\frac{5}{4}}, \left(\frac{1}{2}\right)^{\frac{3}{2}}, \left(\frac{1}{2}\right)^{\frac{7}{4}}, \left(\frac{1}{2}\right)^{2}, \left(\frac{1}{2}\right)^{\frac{9}{4}}, \left(\frac{1}{2}\right)^{\frac{5}{2}}, \left(\frac{1}{2}\right)^{\frac{11}{4}}, \left(\frac{1}{2}\right)^{3}, \left(\frac{1}{2}\right)^{\frac{13}{4}}, \left(\frac{1}{2}\right)^{\frac{7}{2}} \right\}$ |

| Notation | description | Alphabet |
| --- | --- | --- |
| $p_{i,m,l}^{(1)}$ and $p_{i+L,m,l}^{(2)}$ | Differential amplitude for each individual coefficient | $\left\{ 1, \sqrt{\frac{1}{2}}, \sqrt{\frac{1}{4}}, \sqrt{\frac{1}{8}}, \sqrt{\frac{1}{16}}, \sqrt{1/32}, \sqrt{1/64}, \sqrt{1/128} \right\}$ |
| $\varphi_{i,m,l}$ and $\varphi_{i+L,m,l}$ | Phase of each individual coefficient | N-PSK, N = 8 or 16 |

Given these definitions, more precisely, the linear combination representation may be expressed as:

$$W_l = \begin{pmatrix} \sum_{i=0}^{L-1}\sum_{m=0}^{M-1} v_{m_1^{(i)},m_2^{(i)}} p_{i,m,l}^{(1)} p_{i,m,l}^{(2)} \varphi_{i,m,l} \cdot f_{m_3,l}^{H} \\ \sum_{i=0}^{L-1}\sum_{m=0}^{M-1} v_{m_1^{(i)},m_2^{(i)}} p_{i+L,m,l}^{(1)} p_{i+L,m,l}^{(2)} \varphi_{i+2L,m,l} \cdot f_{m_3,l}^{H} \end{pmatrix}$$

Example UL Subband Precoding Via Linear Combination of FD Bases

Some deployments (e.g., NR Release 15 and 16 systems) support codebook-based transmission and non-codebook-based transmission schemes for uplink transmissions with wideband precoders. Codebook-based UL transmission is based on BS feedback and can be used in cases where reciprocity may not hold.

Figure 8:
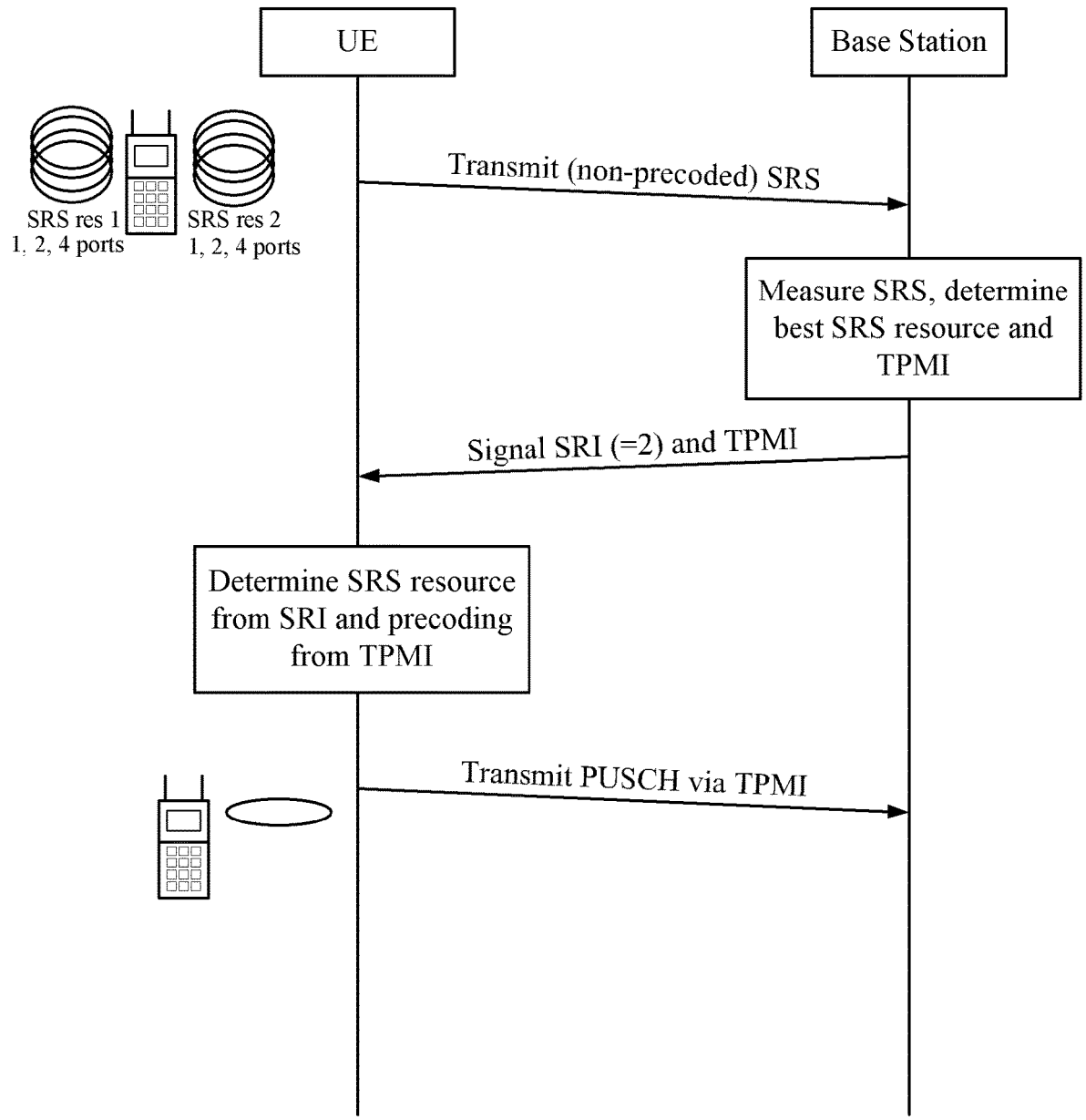
FIG. 8 is a call flow diagram illustrating an example of codebook based UL transmission.

FIG. 8 is a call flow diagram illustrating an example of conventional codebook based UL transmission using a wideband precoder. As illustrated, a UE transmits (non-precoded) SRS with up to 2 SRS resources (with each resource having 1, 2 or 4 ports). The gNB measures the SRS and, based on the measurement, selects one SRS resource and a wideband precoder to be applied to the SRS ports within the selected resource.

As illustrated, the gNB configures the UE with the selected SRS resource via an SRS resource indictor (SRI) and with the wideband precoder via a transmit precoder matrix indicator (TPMI). For a dynamic grant, the SRI and TPMI may be configured via DCI format 0_1. For a configured grant (e.g., for semi-persistent uplink), SRI and TPMI may be configured via RRC or DCI.

The UE determines the selected SRS resource from the SRI and precoding from TPMI and transmits PUSCH accordingly. FIG. 9 illustrates how the wideband precoder (indicated via TPMI) may map transmission layers to PUSCH ports. FIGS. 12A-12F illustrate example precoder matrix sets that may be selected via a TPMI index, for various layer and antenna port combinations.

Figure 10:
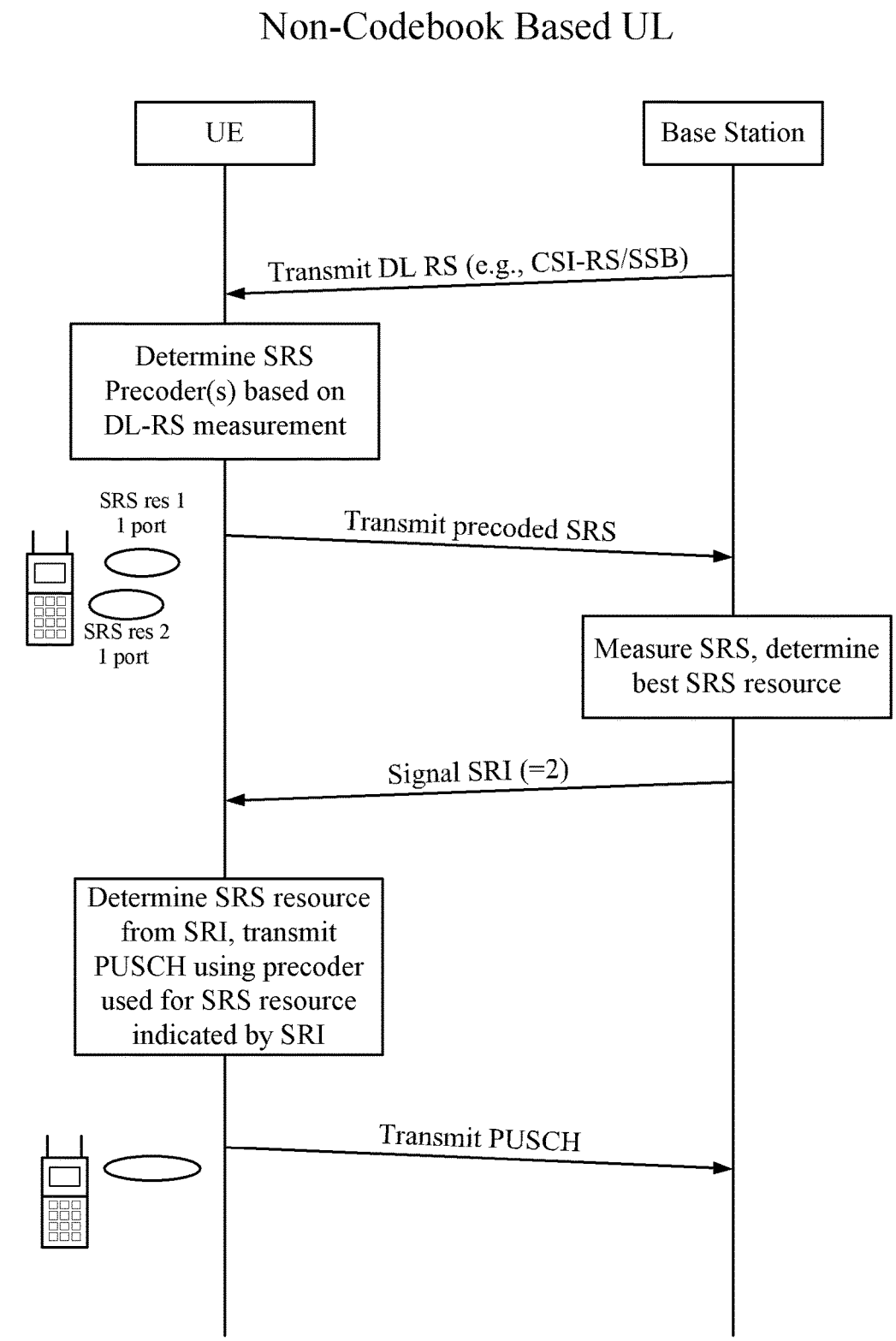
FIG. 10 is a call flow diagram illustrating an example of non-codebook based UL transmission.

FIG. 10 is a call flow diagram illustrating an example of non-codebook based UL transmission. As illustrated, a UE transmits (precoded) SRS. While the example shows 2 SRS resources, the UE may transmit with up to 4 SRS resources (with each resource having 1 port). The gNB measures the SRS and, based on the measurement, selects one or more SRS resource. In this case, since the UE sent the SRS precoded, by selecting the SRS resource, the gNB is effectively also selecting precoding. For non-codebook based UL transmission, each SRS resource corresponds to a layer. The precoder of the layer is actually the precoder of the SRS which is emulated by the UE. Selecting N SRS resources means the rank is N. The UE is to transmit PUSCH using the same precoder as the SRS.

As illustrated, the gNB configures the UE with the selected SRS resource via an SRS resource indictor (SRI). For a dynamic grant, the SRI may be configured via DCI format 0_1. For a configured grant, the SRI may be configured via RRC or DCI.

In this case, the UE determines the selected SRS resource from the SRI, selects the same precoder used when sending that selected SRS resource, and transmits PUSCH accordingly. FIG. 11 illustrates how PUSCH ports are effectively selected via the SRS ports across the selected SRS resource (or resources).

As noted above, wideband precoding is typically used for conventional (e.g., Rel-15 and Rel-16) systems. However, subband precoding may, in some cases, provide gain particular in cases where the number of Tx layers is greater than or equal to 4. One challenge with subband precoding for UL transmission is how to define the transmission scheme for subband precoding and the related signaling (e.g., of the TPMI from the gNB to the UE).

Aspects of the present disclosure propose an UL transmission scheme which achieves subband precoding via a linear combination of frequency domain (FD) bases. As will be described in greater detail below, for each antenna port, one or more FD bases may be applied across all the subbands, and a particular coefficient may be associated with each basis. The gNB measures the UL channel (e.g., based on SRS transmissions) and determine an optimal set of one or more FD bases and the associated coefficients, then configure the FD bases and coefficients to the UE. The resulting subband based precoding may result in a significant performance gain without undue burden in terms of UE implementation.

Figure 13:
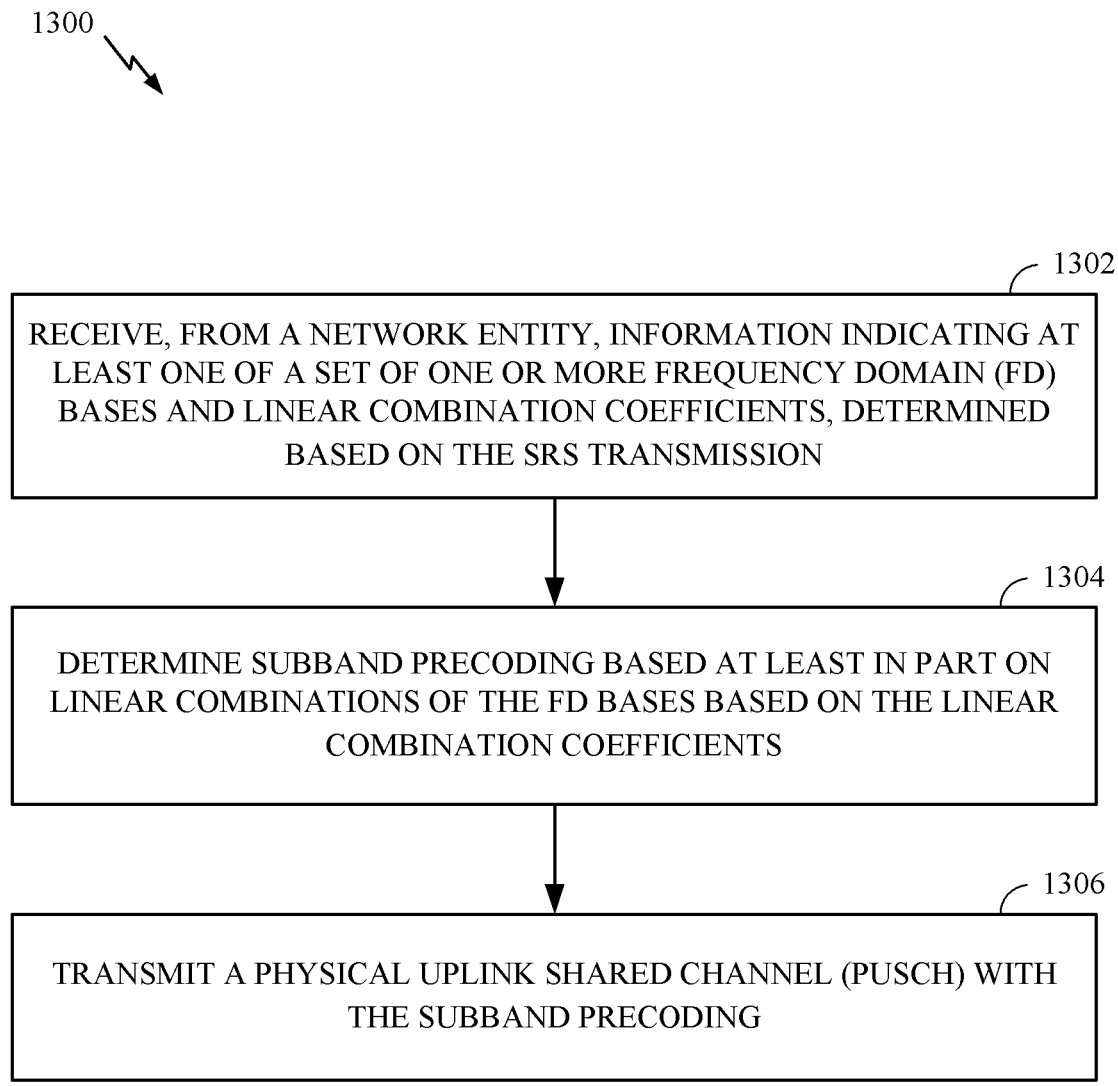
FIG. 13 illustrates example operations for wireless communication by a UE, in accordance with certain aspects of the present disclosure.

FIG. 13 illustrates example operations 1300 for wireless communication by a UE for UL subband precoding, in accordance with certain aspects of the present disclosure. Operations 1300 may be performed, for example, by a UE 120 of FIG. 1 or FIG. 3.

Operations 1300 begin, at 1302, by receiving, from a network entity, information indicating at least one of a set of one or more frequency domain (FD) bases and linear combination coefficients. At 1304, the UE determines subband precoding based at least in part on linear combinations of the FD bases based on the linear combination coefficients. At 1306, the UE transmits a physical uplink shared channel (PUSCH) with the subband precoding.

Figure 14:
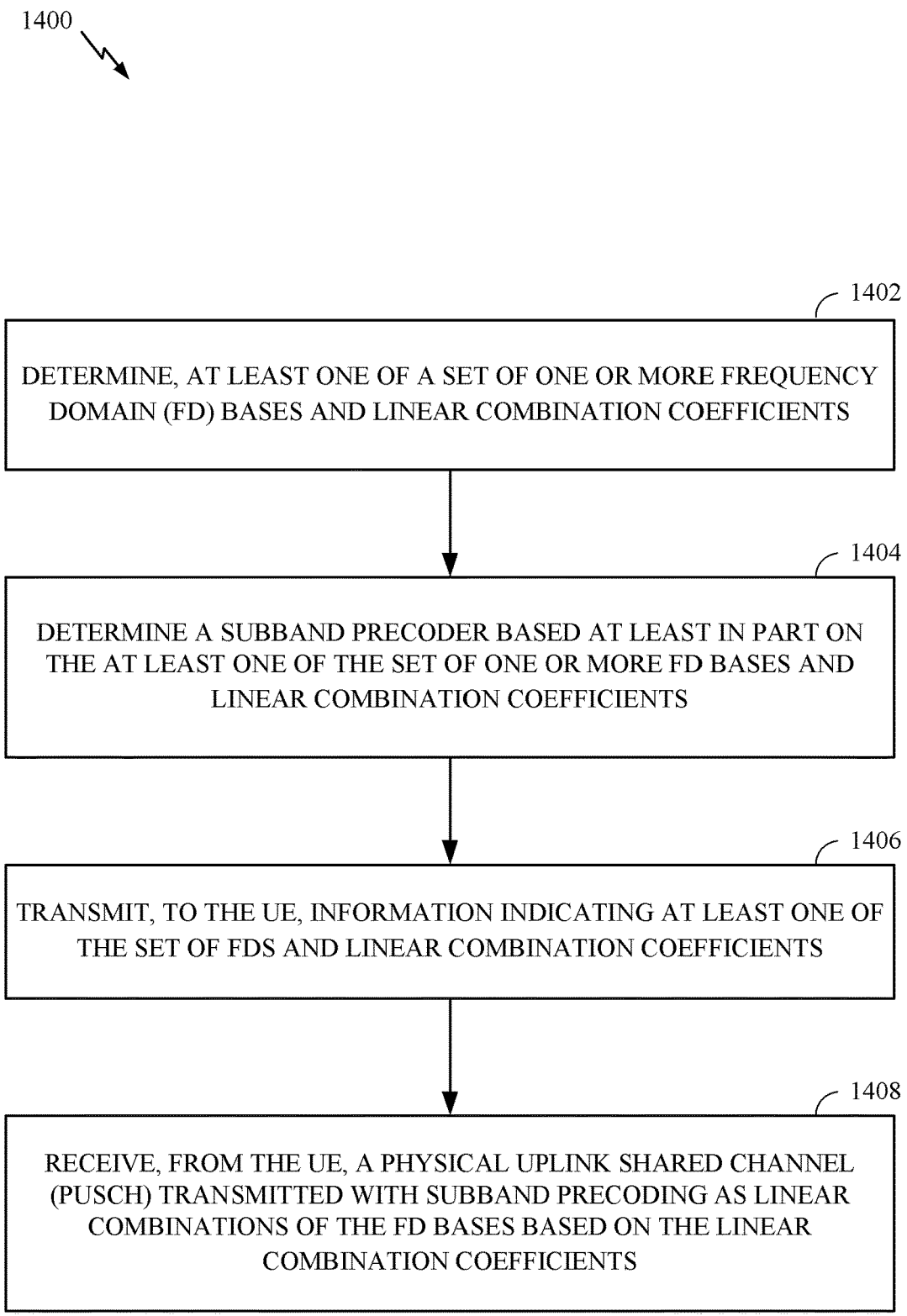
FIG. 14 illustrates example operations for wireless communication by a base station, in accordance with certain aspects of the present disclosure.

FIG. 14 is a flow diagram illustrating example operations 1400 for wireless communication by a network entity (e.g., a base station, such as an eNB or gNB), in accordance with certain aspects of the present disclosure. Operations 1400 may be performed, for example, by BS 110 of FIG. 1 or 3 to configure a UE 120 for UL subband precoding (in accordance with operations 1300 of FIG. 13).

Operations 1400 begin, at 1402, by determining, at least one of a set of one or more frequency domain (FD) bases and linear combination coefficients. At 1404, the network entity determines a subband precoder based at least in part on the at least one of the set of one or more FD bases and linear combination coefficients. At 1406, the network entity transmits, to the UE, information indicating at least one of the set of FDs and linear combination coefficients. At 1408, the network entity receives, from the UE, a physical uplink shared channel (PUSCH) transmitted with subband precoding as linear combinations of the FD bases based on the linear combination coefficients.

Figure 15:
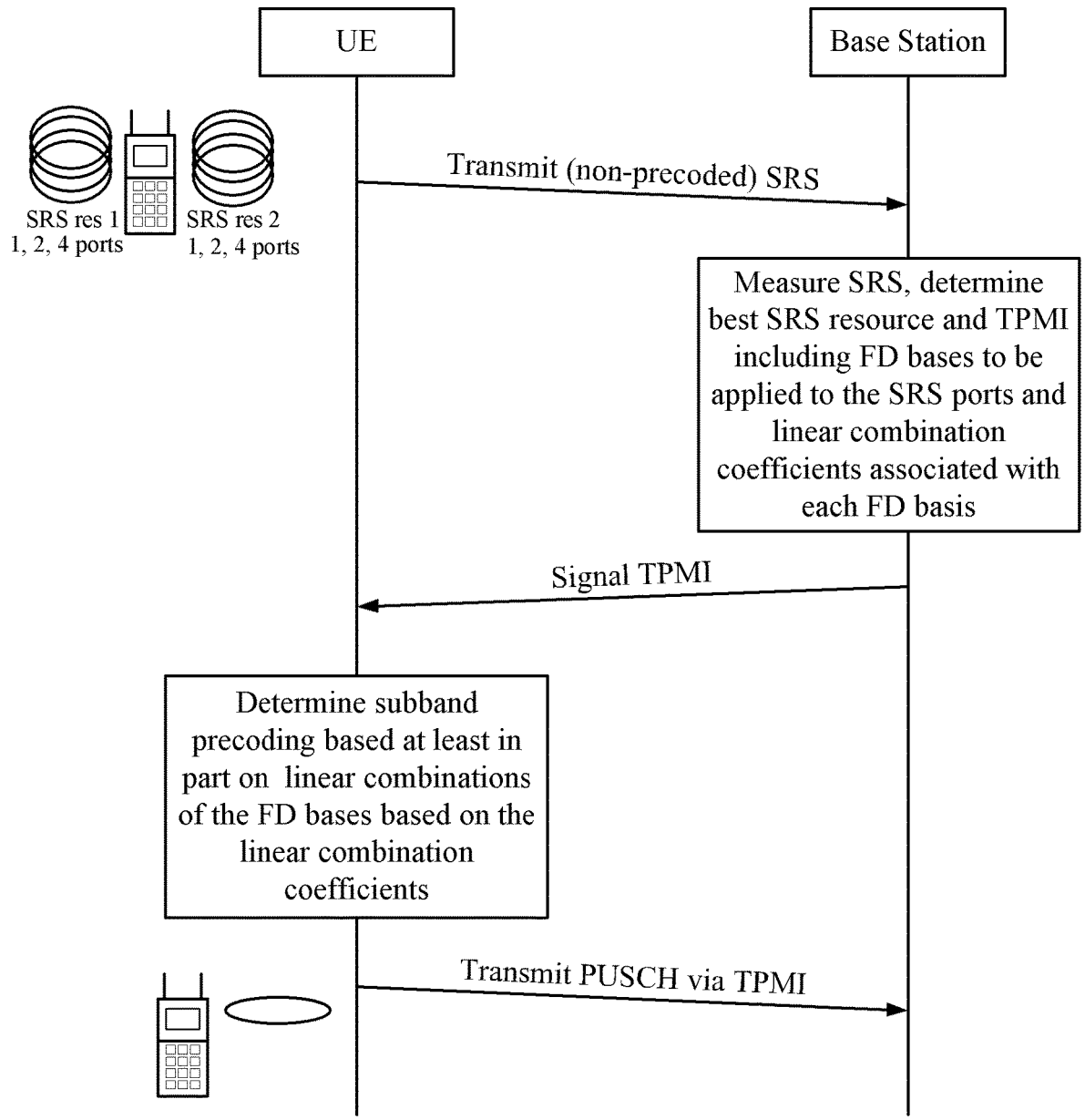
FIG. 15 is a call flow diagram illustrating example UL transmission with subband precoding, in accordance with certain aspects of the present disclosure.

FIG. 15 is a call flow diagram illustrating example UL transmission with subband precoding, which may help in understanding operations 1300 and 1400 of FIGS. 13 and 14. As illustrated, the UE may transmit (non-precoded) SRS. Based on measurement of the SRS, the base station (gNB) selects a set of FD bases and linear combination coefficients associated with each FD basis (collectively included as TPMI).

The gNB then signals this TPMI to the UE. The gNB may transmit the determined FD bases and linear combination coefficients via DCI or RRC or MAC CE to the UE. The UE then transmits PUSCH with subband precoding based on this TPMI (e.g., using linear combinations of FD bases based on the signaled coefficients).

The UL precoder of a layer $l \in \{0, \ldots, v-1\}$ across $N_3$ FD units may be expressed as:

$$\frac{1}{\sqrt{v}} \times \begin{bmatrix} \sum_{m=0}^{M_{0,l}-1} c_{0,m,l} \cdot f_{k_{0,m,l}}^H \\ \sum_{m=0}^{M_{1,l}-1} c_{1,m,l} \cdot f_{k_{1,m,l}}^H \\ \vdots \\ \sum_{m=0}^{M_{p-1,l}-1} c_{p-1,m,l} \cdot f_{k_{p-1,m,l}}^H \end{bmatrix}$$

where $f_{k_{i,m,l}}^H$ of size $1 \times N_3$ is the m-th FD basis applied to SRS port i of layer l and $c_{0,m,l}$ is the linear combination coefficient associated with basis $f_{k_{i,m,l}}^H$. FIG. 16 graphically illustrates how linear combinations of FD bases may be applied to 4 SRS ports (Ports 0-3) across N3 FD units. An FD unit may be an UL subband or an UL physical resource group (PRG) or RB or a subcarrier.

As illustrated in FIGS. 17A-17D, there are various options for configuration of FD bases for UL subband precoding. Each FD basis may be of any suitable type, such as a DFT basis, a DCT basis, Slepian-wolf basis, or fractional DFT basis. Sets of FD bases may be applied in a layer-common or layer-specific manner, as well as antenna port common or antenna port specific manner.

For example, as illustrated in FIG. 17A, in a "layer-common/port-common" approach, the FD bases may include different sets of FD bases, where each set of FD bases is applied to each of the multiple antenna ports for a given transmission layer.

As illustrated in FIG. 17B, in a "layer-specific/port-common" approach, a same set of FD bases may be applied to each of multiple antenna ports and each of multiple spatial layers.

As illustrated in FIG. 17C, in a "layer-common/port-specific" approach, the FD bases may include different sets of FD bases for different antenna ports. For a given antenna port, a same set of FD bases is applied across multiple spatial layers.

As illustrated in FIG. 17D, in a "layer-specific/port-specific" approach, the FD bases may include different sets of FD bases for different antenna ports and different sets of FD bases may be applied for different layers.

There are various approaches for configuring the linear coefficients. In some cases, from total of $\Sigma_{i,l} M_{i,l}$ FD bases, a gNB may further indicate $K_{NZ} \leq \Sigma_{i,l} M_{i,l}$ non-zero coefficients (coefficients for unindicated ports are assumed to be set to zeros), where $M_{i,l}$ denotes the number of FD bases on antenna port i and layer l.

In some cases, the configuration of coefficients may depend on which of the FD basis approaches (described above) is used. For example, for layer-common FD basis selection, $K_{NZ} \leq v \times \Sigma_i M_i$ non-zero coefficients may be indicated where $M_i$ denotes the number of FD bases on antenna port i per layer. For port-common FD basis selection, $K_{NZ} \leq p \times \Sigma_l M_l$ non-zero coefficients may be indicated, where $M_l$ denotes the number of FD bases per antenna port on layer l. For layer-common and port-common FD basis selection, $K_{NZ} \leq p \times v \times M$ non-zero coefficients may be indicated, where M denotes the number of FD bases per antenna port per layer.

The format and content of the coefficients may also vary according to various options. For example, according to a first option, per-coefficient quantization may be used. In this cases, an amplitude quantization (e.g., $|c_{i,m,l}|$) of A bits is used. As an alternative, differential quantization for coefficients of a certain port may be and a certain layer (e.g., $|c_{i,m,l}| = p_{ref,i,l} \cdot p_{i,m,l}$) may be indicated. In such cases, the common part ($p_{ref,i,l}$) may be A1 bits, while the differential part ($p_{i,m,l}$) may be A2 bits. A B-bit phase quantization (e.g., $angle(c_{i,m,l})$) may be indicated.

According to a second options, the coefficients may be indicated via joint-coefficient quantization. In such cases, the non-zero coefficients $\{c_{i,m,l}, \forall i, m, l\}$ may be jointly selected from a candidate set, such as:

{Combo1$\{c_{i,m,l}, \forall i,m,l\}$,Combo2$\{c_{i,m,l}, \forall i,m,l\}$, . . . ,ComboN$\{c_{i,m,l}, \forall i,m,l\}$}.

An example of the sets are illustrated in FIG. 12A~12F.

In some cases, the gNB may configure a UE with FD bases and coefficients via a two stage DCI signaling (involving first and second DCI transmissions). In such cases, a first DCI may provide sufficient information for a complete precoder. For example, the first DCI may indicate at least one (may be more or all) FD bases and corresponding coefficients. According to one option, one coefficient may be indicated per port per FD basis per layer (e.g., via per-coefficient quantization or joint quantization of the single coefficient across the ports, FD basis and layers). According to another option, a reference amplitude per layer per layer may be indicated.

The second DCI may provide the remaining information for subband precoding. For example, the second DCI may indicate remaining FD bases (if all were not included in the first DCI). The second DCI may also indicate the corresponding coefficients (e.g., remaining coefficients or differential power and phase for each of the coefficients).

Figure 18A:
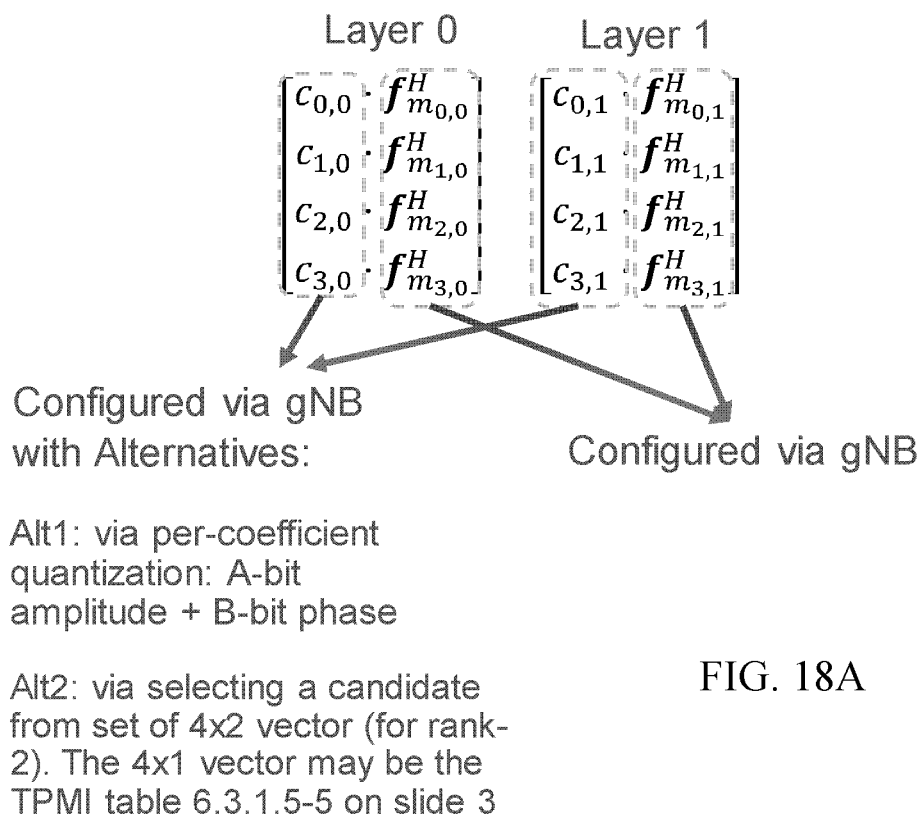
FIGS. 18A and 18B illustrate examples scenarios UL subband precoding, in accordance with aspects of the present disclosure.
Figure 18B:
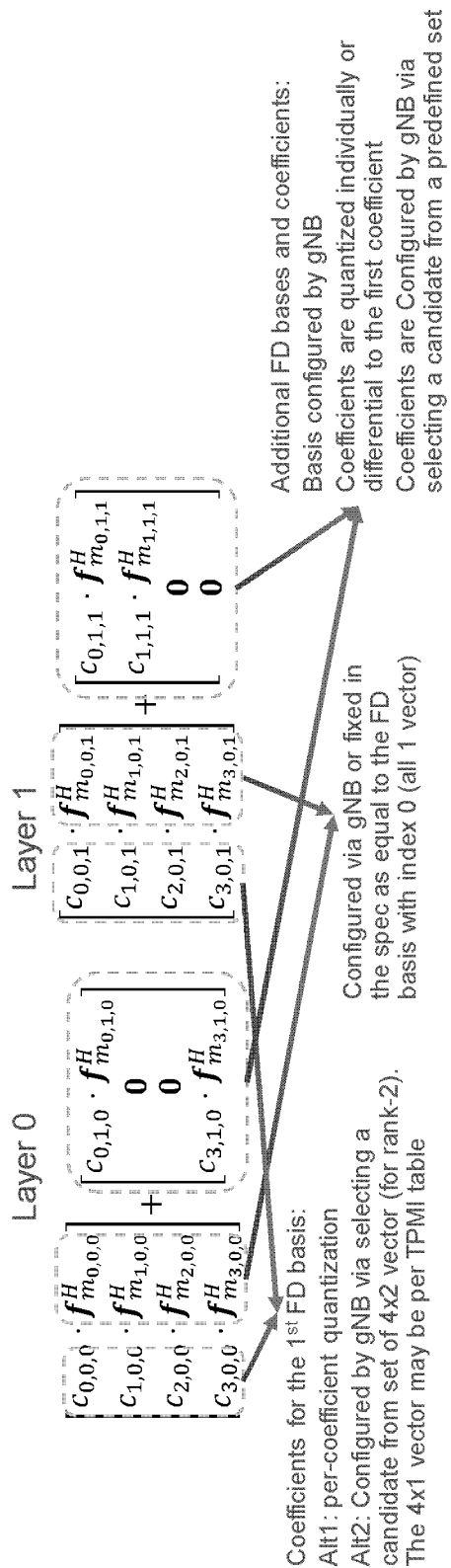

FIGS. 18A and 18B illustrate examples scenarios UL subband precoding, in accordance with aspects of the present disclosure.

The example of FIG. 18A shows a single FD basis per port per layer (e.g., for enhanced small cyclic delay diversity (SCDD) and assumes 4 ports with rank 2 (2 transmission layers). As illustrated, according to one alternative, a gNB may configure coefficients with per-coefficient quantization (e.g., A-bit amplitude and B-bit phase). According to a second alternative, the gNB may select a (4×2 vector) candidate from a set of 4×2 vectors (for rank-2). The 4×2 vector may be, for example, from the TPMI table shown in FIG. 12E. In some cases, for a UE supporting partial coherent UL transmission, the gNB may only configure coefficients and FD bases for a subset of antenna port (per-layer).

FIG. 18B illustrates an example with more than one FD basis per port per layer. Again, this example assumes 4-ports with rank-2. Each port on each layer has at least one FD basis. In this example, the gNB selectively configures more than one FD basis for some port on some layers. In some cases, the maximum number of additional FD bases across all ports and all layers may be configured via RRC or may be fixed.

As with the example of FIG. 18A, coefficients for the 1st FD basis may be based on per-coefficient quantization or configured by gNB via selecting a candidate from set of 4×2 vector (for rank-2). The $1^{st}$ FD bases may be configured via gNB or fixed (e.g., in a standard specification) as equal to the FD basis with index 0 (all 1 vector).

As illustrated, additional FD bases and coefficients may be signaled from some ports on some layers. In such cases, the FD bases may be configured by gNB. Corresponding coefficients may quantized individually or differential to the first coefficient. In some cases, coefficients may be configured by gNB via selecting a candidate from a predefined set. As noted above, for a UE supporting partial coherent UL transmission, the gNB may only configure coefficients and FD bases for a subset of antenna ports (per-layer).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. For example, the various processor shown in FIG. 3 may be configured to perform operations 800 and 900 of FIGS. 8 and 9.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/ or encoded) thereon, the instructions being executable by one or more processors to perform the operations described herein (e.g., instructions for performing the operations described herein and illustrated in FIGS. 13 and 14).

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
receiving, from a network entity, information indicating at least one of one or more sets of one or more frequency domain (FD) bases and linear combination coefficients, wherein the information is signaled via at least first and second downlink control information (DCI) transmissions;
determining subband precoding based at least in part on linear combinations of the FD bases based on the linear combination coefficients, wherein the subband precoding maps physical uplink shared channel (PUSCH) layers to antenna ports; and
transmitting a PUSCH with the subband precoding.

2. The method of claim 1, wherein the antenna ports comprise at least one of PUSCH ports or SRS ports.

3. The method of claim 1, wherein:
the FD bases comprise one set of FD bases, and it is applied to each antenna port and each layer.

4. The method of claim 1, wherein the FD bases have one or more set of FD bases, wherein a particular set of FD bases is applied to a particular layer and is applied to each antenna port of the layer.

5. The method of claim 1, wherein:
the FD bases have one or more set of FD bases, wherein a particular set of FD bases is applied to a particular port and is applied to each layer of the port.

6. The method of claim 1, wherein:
the FD bases comprise one or more set of FD bases, wherein a particular set of FD bases is applied to a particular port on a particular layer.

7. The method of claim 1, wherein the linear combination coefficients comprise:
a first set of coefficients representing quantized amplitude values; and
a second set of coefficients representing quantized phase values.

8. The method of claim 7, wherein the first set of coefficients comprise, for a certain antenna port and transmission layer:
a common quantized amplitude value; and
a set of differential amplitude values for each of a set of FD bases.

9. The method of claim 7, wherein:
only non-zero coefficients are indicated; and
coefficients for unindicated SRS ports are set to zero.

10. The method of claim 1, wherein the linear combination coefficients comprise non-zero coefficients jointly selected from candidate sets of linear combination coefficients.

11. The method of claim 10, wherein:
only non-zero coefficients are indicated; and
coefficients for unindicated SRS ports are set to zero.

12. The method of claim 1, wherein the first DCI transmission indicates:
at least one FD basis; and
at least one coefficient associated with the at least one FD basis or a reference amplitude associated with the at least one FD basis.

13. The method of claim 12, wherein the first DCI transmission indicates:
at least one FD basis of the set of FD bases; and
at least one coefficient per antenna port per transmission layer, or
a reference amplitude per antenna port per layer.

14. The method of claim 13, wherein the second DCI transmission indicates:
remaining FD bases of the set of FD bases, and
remaining coefficients for each antenna port and transmission layer, or
differential power and phase information for each coefficient.

15. The method of claim 1, further comprising:
receiving an indication of a wideband precoder and rank selected from a candidate set; and
determining the subband precoder jointly using the wideband precoder and linear combinations of the FD bases based on the linear combination coefficients.

16. The method of claim 15, wherein:
the first DCI transmission indicates the wideband precoder; and
the second DCI transmission indicates the FD bases and associated coefficients.

17. A method for wireless communications by a network entity, comprising:
determining, at least one of one or more sets of one or more frequency domain (FD) bases and linear combination coefficients;
determining a subband precoder based at least in part on the at least one of the set of one or more FD bases and linear combination coefficients wherein the subband precoding maps physical uplink shared channel (PUSCH) layers to antenna ports;
transmitting, to a user equipment (UE), information indicating the at least one of the one or more sets of FD bases and linear combination coefficients, wherein the information is signaled via at least first and second downlink control information (DCI) transmissions; and
receiving, from the UE, a physical uplink shared channel (PUSCH) transmitted with subband precoding as linear combinations of the FD bases based on the linear combination coefficients.

18. The method of claim 17, wherein the antenna ports comprise at least one of PUSCH ports or SRS ports.

19. The method of claim 17, wherein:
the FD bases comprise one set of FD bases, and it is applied to each antenna port and each layer.

20. The method of claim 17, wherein the FD bases have one or more set of FD bases, wherein a particular set of FD bases is applied to a particular layer and is applied to each antenna port of the layer.

21. The method of claim 17, wherein:
the FD bases have one or more set of FD bases, wherein a particular set of FD bases is applied to a particular port and is applied to each layer of the port.

22. The method of claim 17, wherein:
the FD bases comprise one or more set of FD bases, wherein a particular set of FD bases is applied to a particular port on a particular layer.

23. The method of claim 17, wherein the linear combination coefficients comprise:
a first set of coefficients representing quantized amplitude values; and
a second set of coefficients representing quantized phase values.

24. The method of claim 23, wherein the first set of coefficients comprise, for a certain antenna port and transmission layer:
a common quantized amplitude value; and
a set of differential amplitude values for each of a set of FD bases.

25. The method of claim 23, wherein:
only non-zero coefficients are indicated; and
coefficients for unindicated SRS ports are set to zero.

26. The method of claim 17, wherein the linear combination coefficients comprise non-zero coefficients jointly selected from candidate sets of linear combination coefficients.

27. The method of claim 26, wherein:
only non-zero coefficients are indicated; and
coefficients for unindicated SRS ports are set to zero.

28. The method of claim 17, wherein the first DCI transmission indicates:
at least one FD basis; and
at least one coefficient associated with the at least one FD basis or a reference amplitude associated with the at least one FD basis.

29. The method of claim 17, wherein the first DCI transmission indicates:
at least one FD basis of the set of FD bases; and
for each of the at least one FD basis,
at least one coefficient per antenna port per transmission layer, or
a reference amplitude per antenna port per layer.

30. The method of claim 29, wherein the second DCI transmission indicates:
remaining FD bases of the set of FD bases, and
for each of the remaining FD bases,
remaining coefficients for each antenna port and transmission layer, or
differential power and phase information for each coefficient.

31. The method of claim 17, further comprising:
determining the subband precoding jointly using a wideband precoder and the at least one of the set of one or more FD bases and linear combination coefficients; and
sending the UE an indication of a wideband precoder and rank selected from a candidate set.

32. The method of claim 31, wherein:
an indication of the wideband precoder is provided via the first DCI transmission; and
an indication of the FD bases and associated coefficients is provided via the second DCI transmission.

\* \* \* \* \*